(12) United States Patent
Wyman et al.

(10) Patent No.: US 12,446,501 B2
(45) Date of Patent: Oct. 21, 2025

(54) PLANT GROWTH SYSTEM FOR MICROGRAVITY ENVIRONMENTS

(71) Applicant: Sierra Space Corporation, Broomfield, CO (US)

(72) Inventors: Dan Wyman, Madison, WI (US);
Samuel A. Moffatt, Madison, WI (US);
Michael Peterson, Bondurant, IA (US);
John P. Wetzel, Verona, WI (US)

(73) Assignee: Sierra Space Corporation, Louisville, CO (US)

( * ) Notice: Subject to any disclaimer, the term of this patent is extended or adjusted under 35 U.S.C. 154(b) by 76 days.

(21) Appl. No.: 17/303,094

(22) Filed: May 19, 2021

(65) Prior Publication Data

US 2022/0369580 A1   Nov. 24, 2022

(51) Int. Cl.
*A01G 31/02* (2006.01)

(52) U.S. Cl.
CPC ............ *A01G 31/02* (2013.01); *A01G 31/065* (2025.01)

(58) Field of Classification Search
CPC .......................... A01G 31/02; A01G 2031/006
See application file for complete search history.

(56) References Cited

U.S. PATENT DOCUMENTS

| | | | |
|---|---|---|---|
| 4,926,585 A | 5/1990 | Dreschel | |
| 5,225,342 A | 7/1993 | Farrell | |
| 5,787,641 A * | 8/1998 | Watkins | A01G 9/029 47/65.6 |
| 7,937,891 B2 * | 5/2011 | Benfey | A01G 7/00 47/60 |
| 9,974,243 B2 * | 5/2018 | Martin | A01G 9/249 |
| 10,123,491 B2 * | 11/2018 | De Fazio | A01G 25/02 |
| 10,136,592 B2 * | 11/2018 | Broutin Farah | A01G 31/00 |
| 10,492,387 B1 * | 12/2019 | Davison | A01G 31/02 |
| 10,555,466 B2 * | 2/2020 | Gonyer | H05B 45/20 |
| 10,729,079 B2 * | 8/2020 | Nguyen | A01G 27/06 |
| 10,834,879 B2 * | 11/2020 | Zhang | A01G 31/02 |

(Continued)

OTHER PUBLICATIONS

Carillo et al., "Challenges for a Sustainable Food Production System on Board of the International Space Station: A Technical Review," Agronomy 2020, 10, 687, May 13, 2020 (17 pp.).

(Continued)

*Primary Examiner* — Joshua D Huson
*Assistant Examiner* — Spencer T Callaway
(74) *Attorney, Agent, or Firm* — Mintz Levin Cohn Ferris Glovsky and Popeo, P.C.

(57) ABSTRACT

A plant growth system for a microgravity environment includes a root chamber configured to prevent liquid from escaping from the root chamber in the microgravity environment and to enable recovery of liquid from within the root chamber. In some embodiments, the root chamber may be configured to provide water and/or nutrients to the plants, via ebb/flow and/or spray delivery. In some embodiments, the root chamber includes a main body and a root/shoot interface coupled to the main body. The root/shoot interface can be configured to hold a plant having a root system extending outward from one side of the root/shoot interface into the root chamber and a chute system extending outward from another side of the root/shoot interface outside of the root chamber. The root/shoot interface may be configured to provide water and/or nutrients to the plants.

16 Claims, 23 Drawing Sheets

(56) References Cited

U.S. PATENT DOCUMENTS

| | | | |
|---|---|---|---|
| 11,122,749 B2 | 9/2021 | Villaflores et al. | |
| 11,324,171 B2* | 5/2022 | Hsueh | A01G 27/003 |
| 11,457,578 B2* | 10/2022 | Marder-Eppstein | A01G 9/143 |
| 11,464,173 B2* | 10/2022 | Tomasovics | A01G 7/045 |
| 2011/0232185 A1* | 9/2011 | Ahmadi | A01G 27/04 |
| | | | 47/66.6 |
| 2018/0007845 A1 | 1/2018 | Martin | |
| 2020/0344965 A1* | 11/2020 | Song | H05B 47/16 |
| 2020/0390046 A1 | 12/2020 | Weislogel et al. | |
| 2022/0132759 A1* | 5/2022 | Hill | A01G 27/005 |
| | | | 47/62 N |

OTHER PUBLICATIONS

Moffatt et al., "Astro Garden Aeroponic Plant Growth System Design Evolution," 49th International Conference on Environmental Systems, Jul. 7, 2019 (13 pp.).

Carillo et al. (2020). "Challenges for a Sustainable Food Production System on Board of the International Space Station: A Technical Review," Agronomy 2020, 10, 687, May 13, 2020 (17 pp.).

Moffatt et al. (2019). "Astro Garden Aeroponic Plant Growth System Design Evolution," 49th International Conference on Environmental Systems, Jul. 7, 2019 (13 pp.).

\* cited by examiner

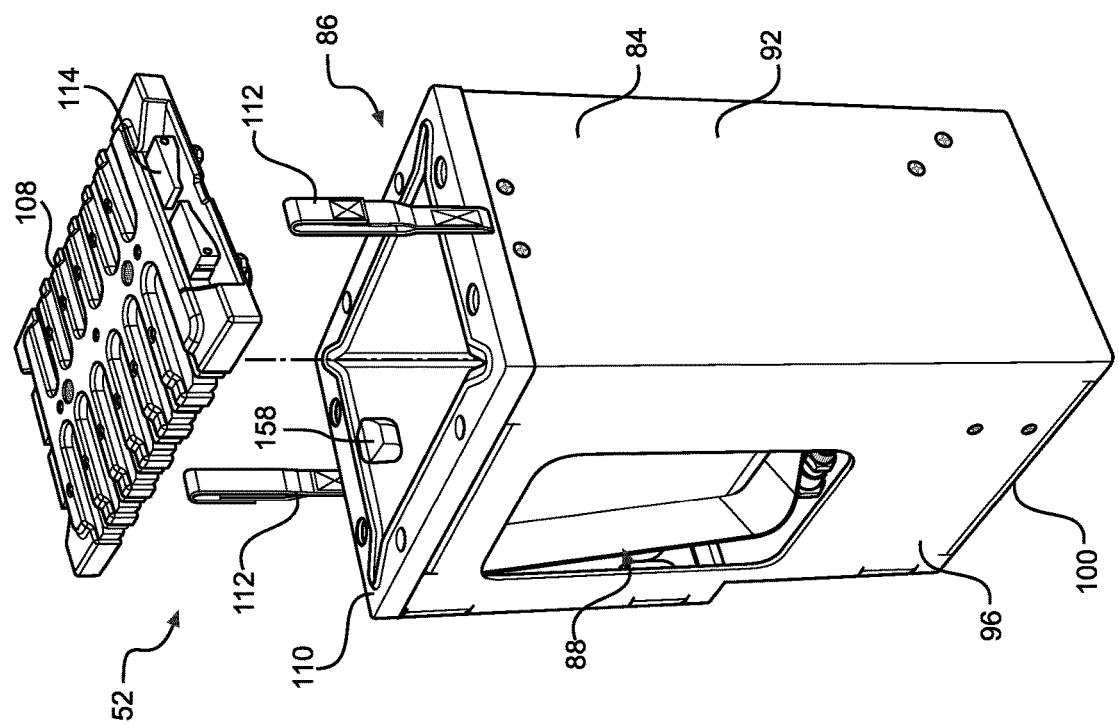
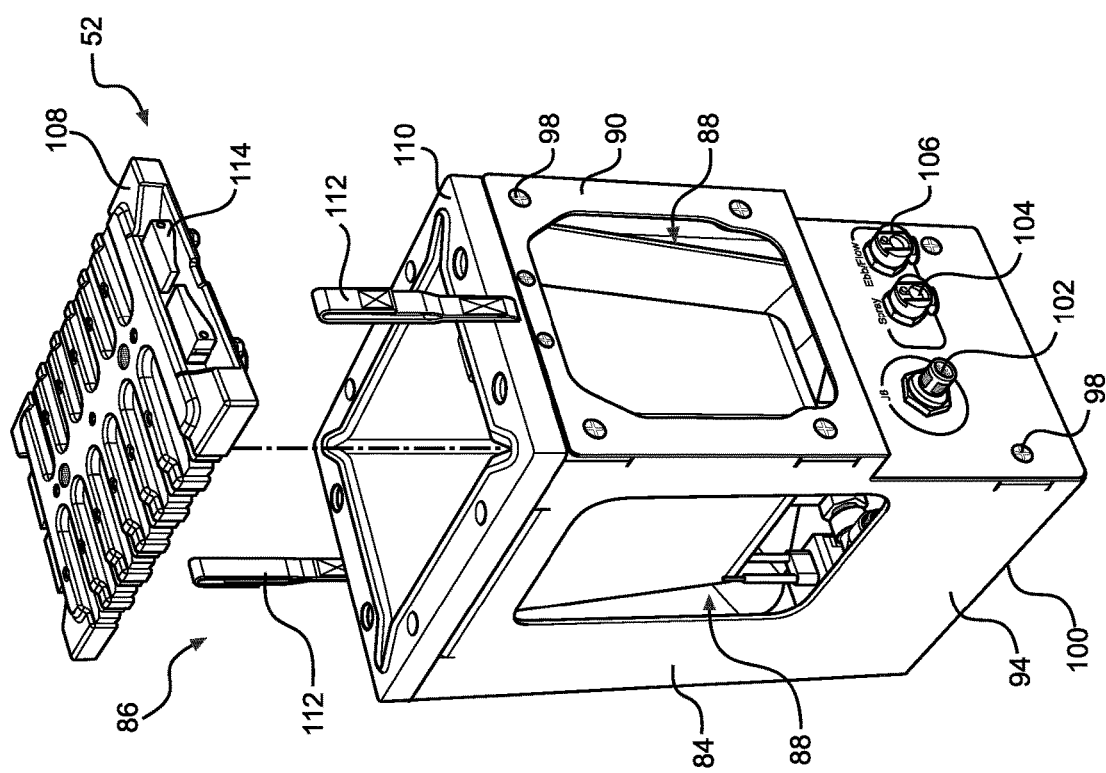

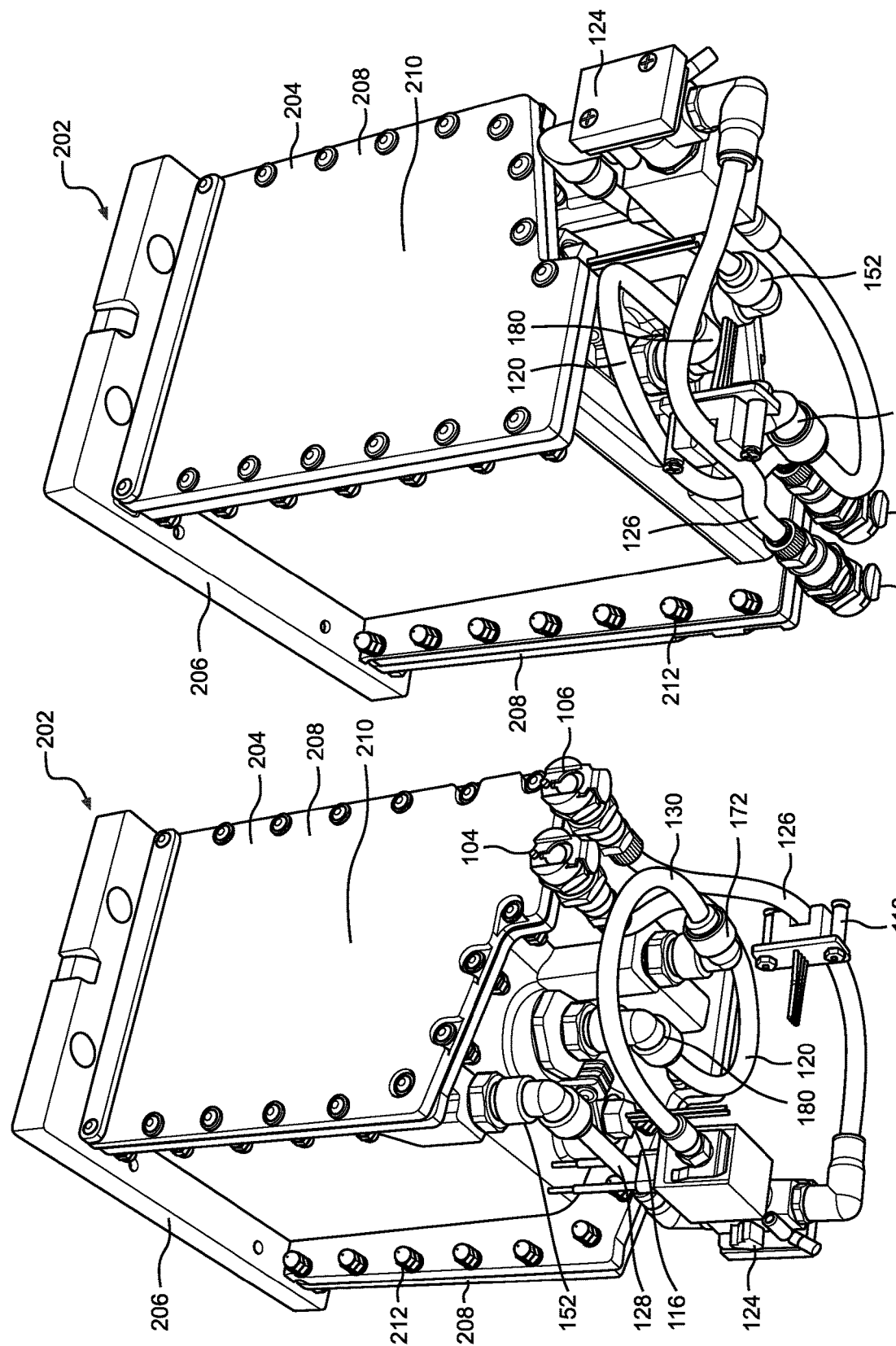

PLANT GROWTH SYSTEM FOR MICROGRAVITY ENVIRONMENTS

TECHNICAL FIELD

This relates to plant growth systems for microgravity environments. This especially relates to plant growth systems including a root chamber configured to enable delivery and recovery of liquid to the roots of plants in a microgravity environment.

BACKGROUND

Growing plants in a microgravity environment such as space presents a number of problems. One problem is that fluids behave differently in such an environment. They do not flow to the bottom of a container like they do on Earth. This presents a challenge when trying to move and/or recover fluid in such plant growth systems.

Another problem is that conventional plant growth experiments aboard the International Space Station (ISS) use soil or particulate media for the growth medium, which increases the overall mass that must be transported into and maneuvered through space. Yet another problem is that the plants themselves grow in a manner that is different than they would in the presence of Earth's gravity.

It is desirable to provide a reliable method to grow plants in a microgravity environment. Such plant growth systems can be used to support Earth-orbiting spacecraft as well as long distance/duration spacecraft such as those that are being developed to travel to locations such as Mars.

GENERAL DESCRIPTION

A plant growth system is described that can be used to grow plants in microgravity environments such as those on spacecraft, orbital flight vehicles, sub-orbital flight vehicles, and the like. The plant growth system includes an enclosed root chamber with a root/shoot interface. The root system extends through one side of the root/shoot interface into the root chamber and the shoot system extends through an opposite side of the root/shoot interface outside the root chamber.

The plant growth system and its individual components can be implemented in a variety of ways. The following is a description of a number of different embodiments of the system. It should be appreciated that any feature or advantage of one embodiment can, individually, be combined with or used in connection with any another embodiment. Accordingly, there are many possible embodiments of the plant growth system beyond the specific embodiments described in this document.

In some embodiments, the plant can be grown from a plant seed positioned in the root/shoot interface. The seed can be placed in the root/shoot interface and provided the necessary nutrients, moisture, and other conditions required for the seed to germinate, sprout, and grow.

In some embodiments, the root/shoot interface is positioned at the top of the root chamber. The root/shoot interface can have any of a number of configurations. For example, the root/shoot interface can be coupled to a main body to form the root chamber. The root/shoot interface can also be formed as an integral part of the root chamber. The root/shoot interface can also include a port through which water and/or a nutrient solution can be delivered to the plant seed.

In some embodiments, the plant growth system can be used to grow plants without any particulate growth medium. This can be accomplished by supplying nutrients the plant roots using hydroponic and/or aeroponic delivery and recovery techniques adapted for microgravity applications. Growing plants without any particulate growth medium is advantageous because it reduces the overall mass and cost to grow plants in space.

In some embodiments, including an aeroponic system, one or more nozzles are configured to spray nutrient solution on the root systems of the plants. In some embodiments including a hydroponic system, one or more fluid connections are configured to fill and drain (flow/ebb) the root chamber with a nutrient solution. The plant growth system can include one or both of an aeroponic system or a hydroponic system for delivering nutrients and water to the plants.

In some embodiments, the plant growth system is configured to use capillary forces and/or surface tension to control the movement of fluids. For example, the root chamber can include one or more capillary channels extending vertically upward along the sides and/or horizontally along the top, bottom, and/or sides. The capillary channels can converge at a capillary collection area in the root chamber.

In some embodiments, the plant growth system includes a viewing window through which the root systems of the plants are visible. For example, the viewing window can be a transparent wall of the root chamber through which the interior of the root chamber is visible. The viewing window can be used to monitor and track the growth and development of the root systems of the plants.

In some embodiments, the plant growth system includes a clearing system that can be used to periodically clear the viewing window. The viewing window may become covered with spray, debris, water spots, and the like that may make it difficult to view the interior of the root chamber and/or the root systems of the plants.

In some embodiments, the clearing system includes a fluid outlet configured to direct a flow of liquid over an interior surface of the viewing window. The liquid flows across the interior surface, preferably as a laminar flow, and removes debris and other material that make it difficult to see into the root chamber. In some embodiments, it may be desirable to view the interior of the chamber while the liquid flow is passing over the interior surface of the viewing window.

In some embodiments, the plant growth system includes an imaging system that can be used to take images of the root systems of the plants. For example, the imaging system can include an imaging device configured to take images of the interior of the root chamber through the viewing window.

In some embodiments, the clearing system can be used to clear the viewing window and allow images to be taken of the plant roots in the root chamber. In some embodiments, the imaging device may be configured to take images while the liquid flows across the interior surface of the viewing window. Thus, the image is taken through a sheet of liquid flowing on the interior surface of the viewing window. In such situations, it is preferable for the liquid to form a laminar flow across the interior surface to allow a clear image to be taken.

In some embodiments, the root chamber can be configured to allow gas exchange with the external environment to equalize the pressure in the root chamber and the external environment and to provide oxygen to the plant roots, which they require for respiration. For example, the root chamber can include a vent configured to allow gas exchange between the root chamber and the surrounding environment while preventing liquid from escaping from the root chamber.

In some embodiments, the plant growth system can include a controller configured to control fluid flow in the root chamber. For example, the controller can be an electronic controller and can be used to determine the flow rate of liquid and/or gas through a drain in the root chamber and shut off the drain based on the flow rate of the liquid being below a threshold value or the flow rate of the gas being above a threshold value.

The summary is provided to give a brief introduction to the described subject matter as well as a synopsis of some of the technological improvements and/or advantages it provides. The summary and background are not intended to identify essential aspects of the described subject matter, nor should they be used to constrict or limit the scope of the claims. For example, the scope of the claims should not be limited based on whether the recited subject matter includes any or all aspects noted in the summary and/or addresses any of the issues noted in the background.

DRAWINGS

The preferred and other embodiments are described in association with the accompanying drawings in which:

FIG. 3 is front perspective view of another embodiment of a root module that can be used with the plant growth system.

FIG. 4 is a rear perspective view of the root module in FIG. 3.

FIGS. 23-24 are perspective views of the main body in FIGS. 21-22 showing the manner that the fluid lines connect to the main body.

DETAILED DESCRIPTION

Figure 1:
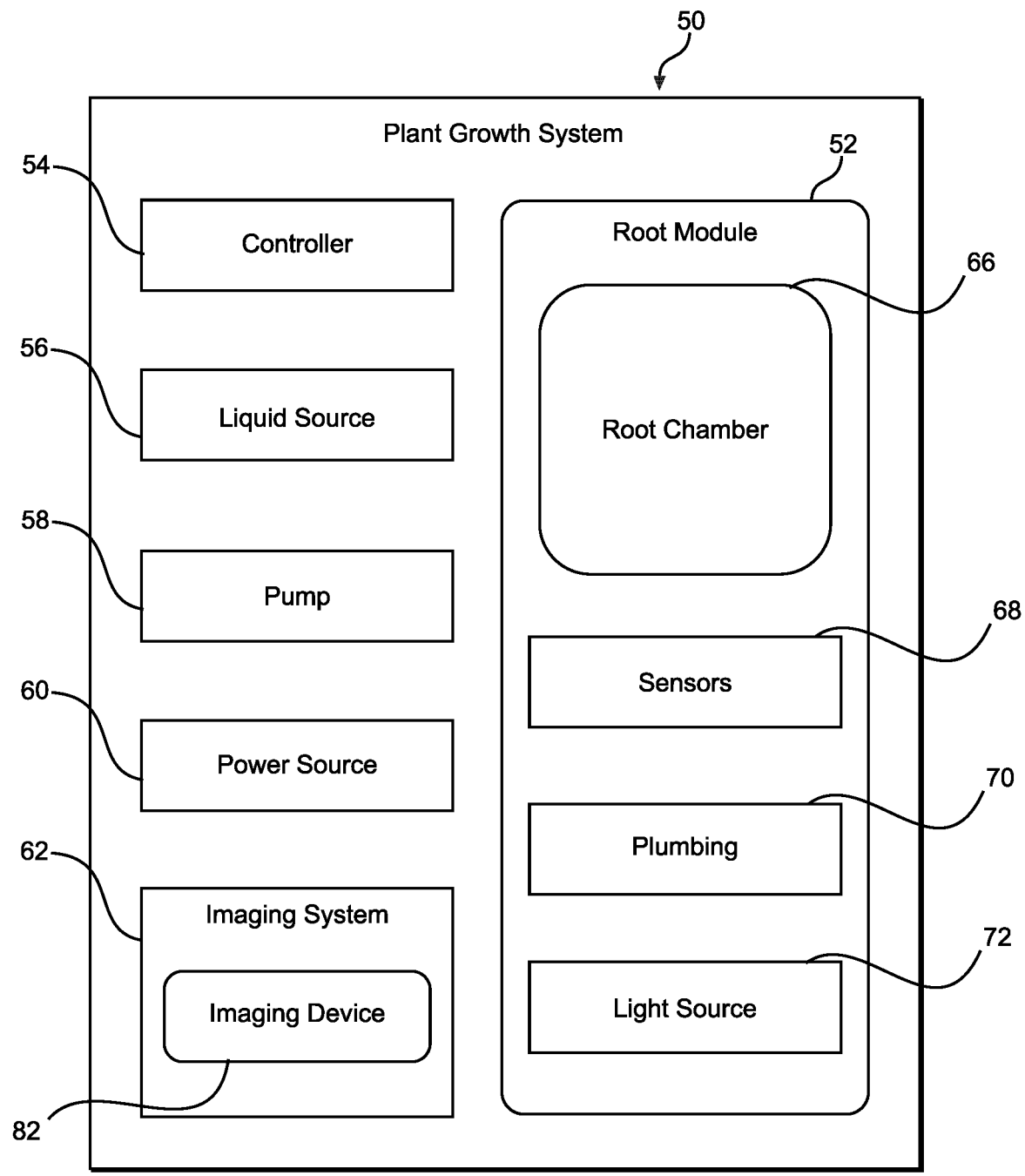
FIG. 1 is a conceptual diagram of one embodiment of a plant growth system.

FIG. 1 shows a conceptual diagram of one embodiment of a plant growth system 50 that is suitable for use in microgravity environments. The plant growth system 50 includes a root module 52 (alternatively referred to as a plant growth assembly), a controller 54 (alternatively referred to as a control system), a liquid source 56, a pump 58, a power source 60, and an imaging system 62 (alternatively referred to as a viewing system).

The root module 52 is where the plants 64 grow. The root module 52 includes a root chamber 66 (alternatively referred to as a root enclosure), sensors 68, plumbing 70, and a light source 72. The root chamber 66 includes a main body 74 and a root/shoot interface 76. The root chamber 66 is configured to be watertight or liquid tight and thus prevent liquid from escaping in a microgravity environment. The plant growth system 50 may utilize a single root module 52 or multiple root modules.

Figure 2:
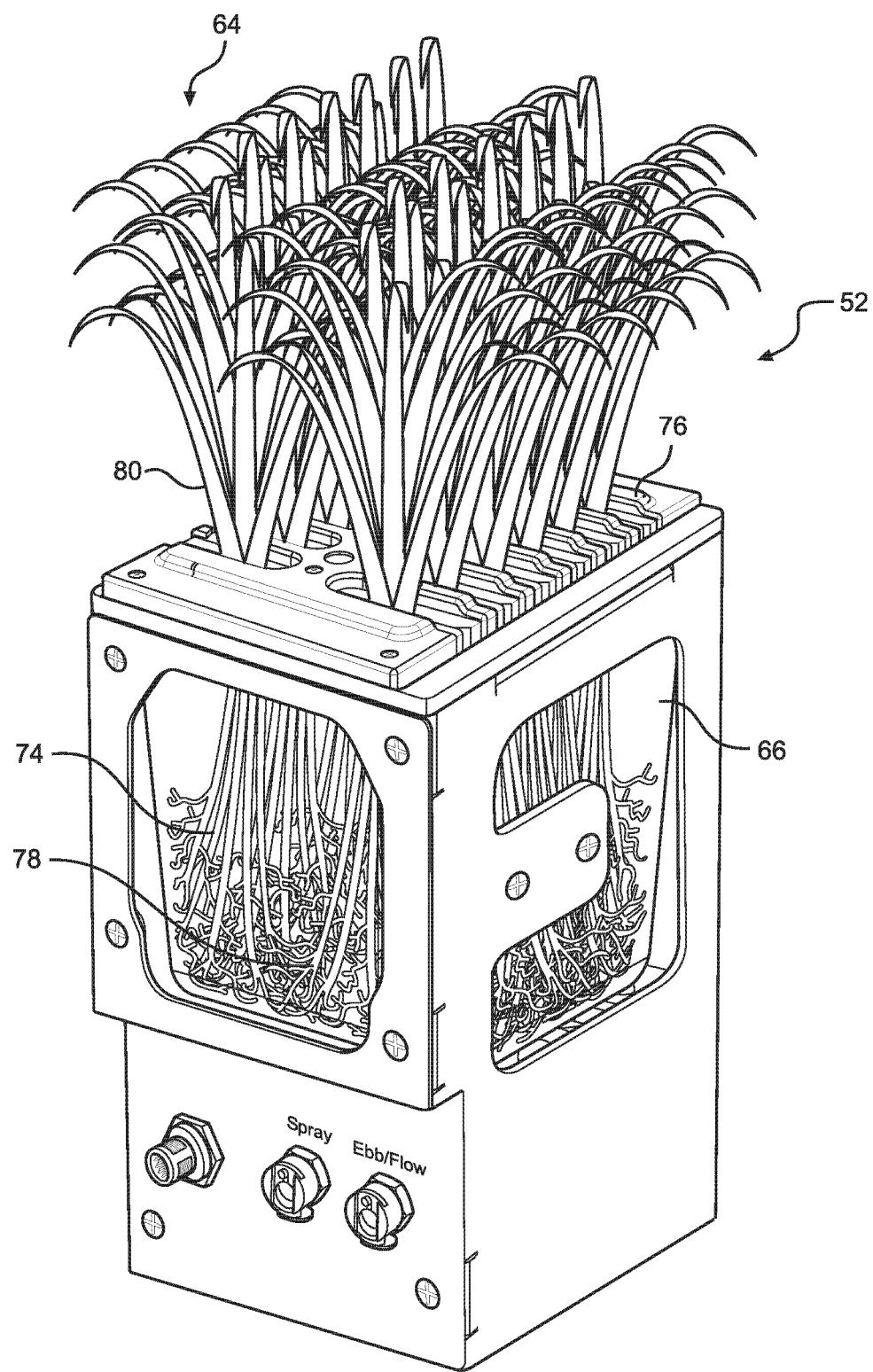
FIG. 2 is a perspective view of one embodiment of a root module that can be used with the plant growth system.
Figure 6:
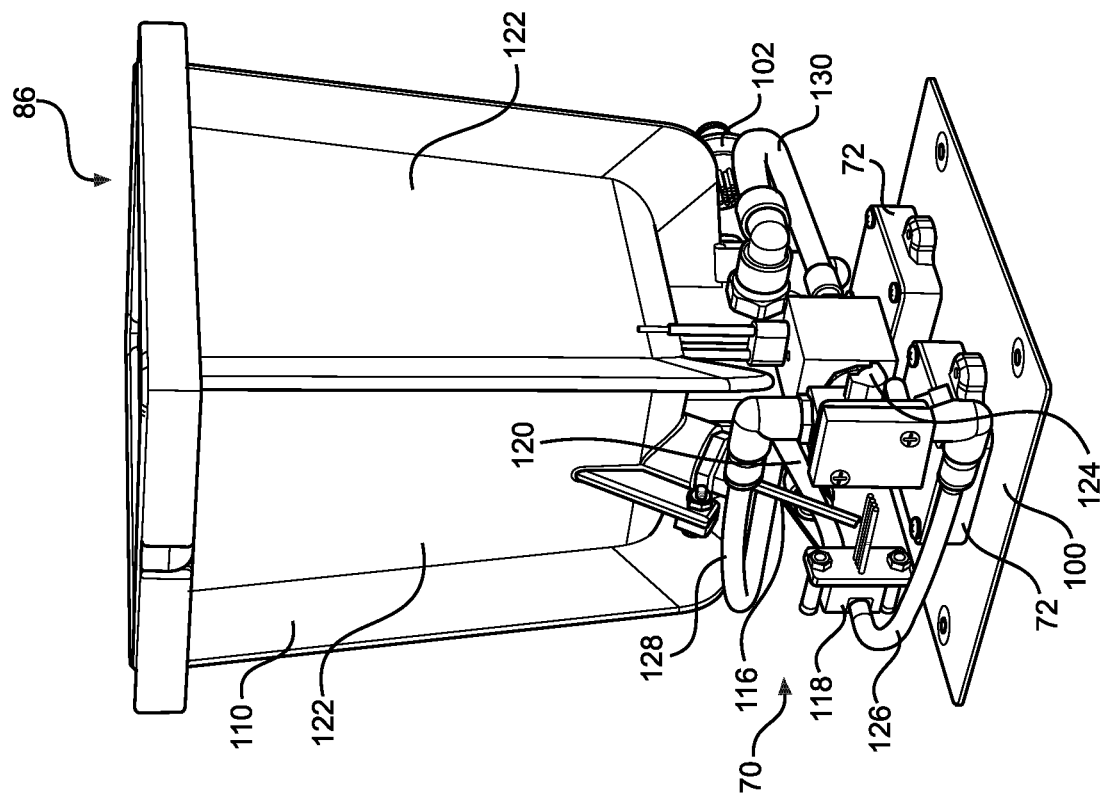
FIGS. 5-8 are perspective views of the root module in FIGS. 3-4 with the outer walls of the housing and the root/shoot interface removed.
Figure 5:
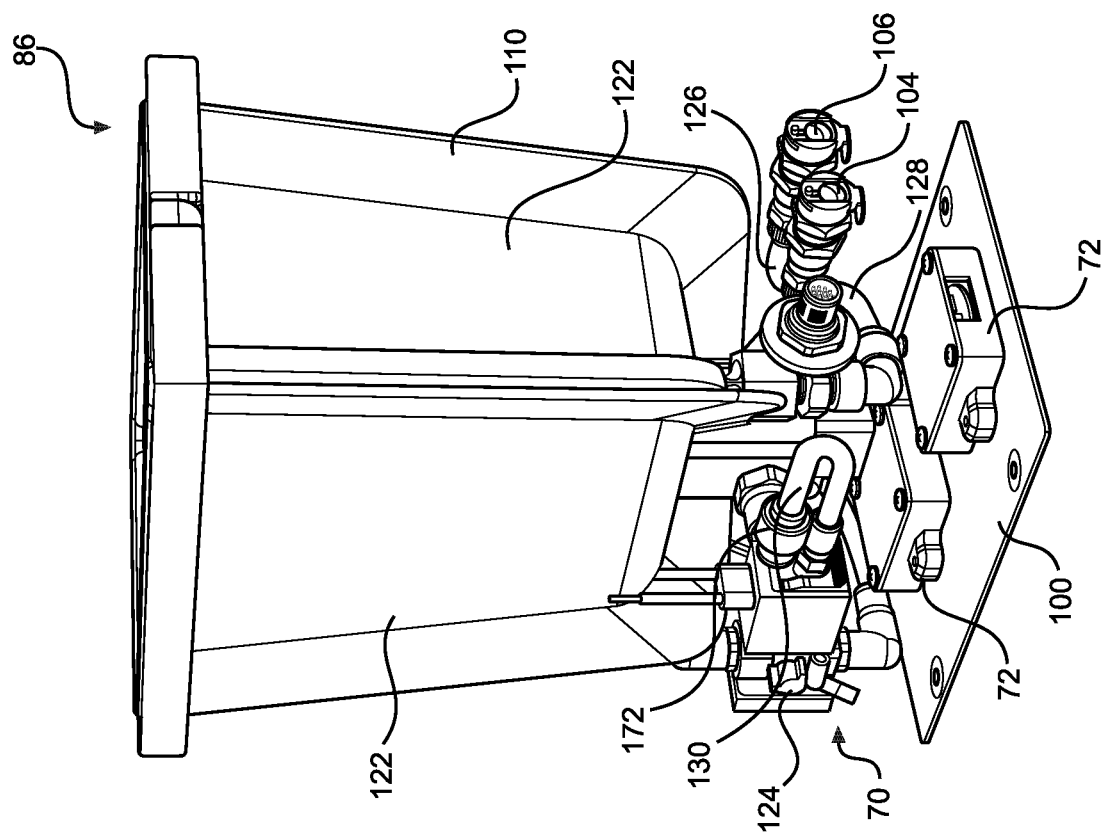
Figure 8:
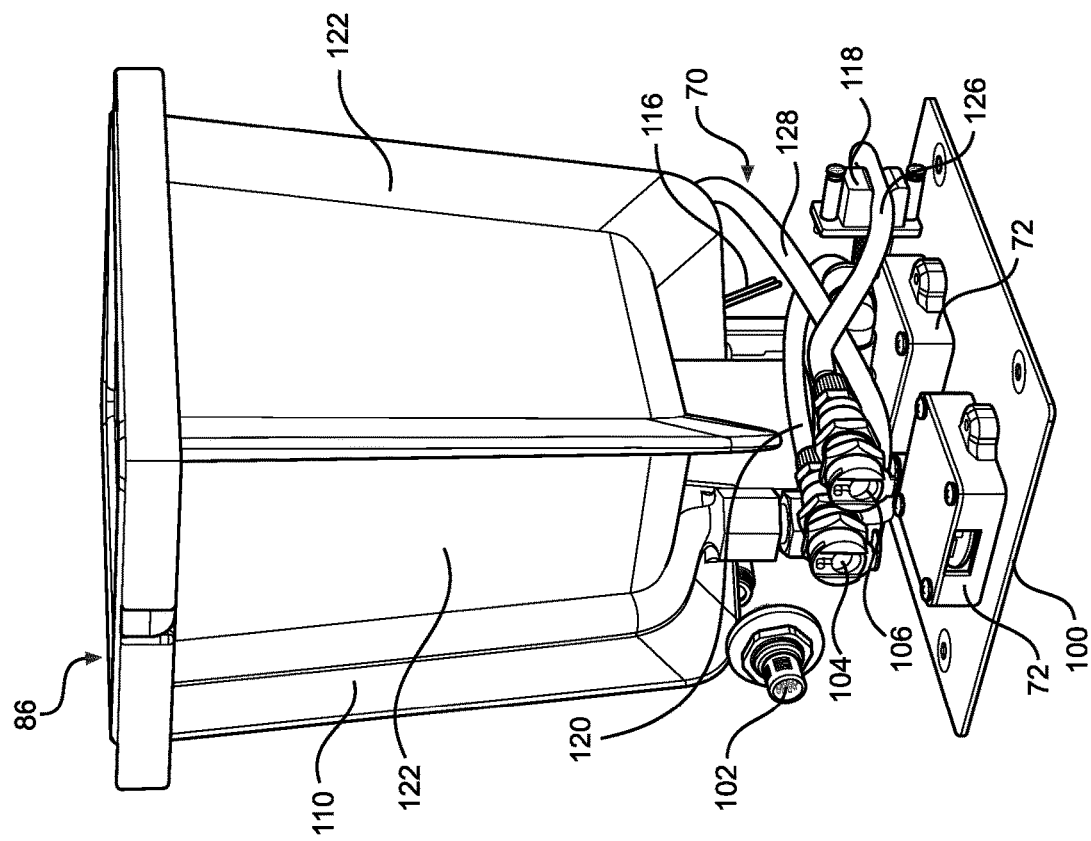
Figure 7:
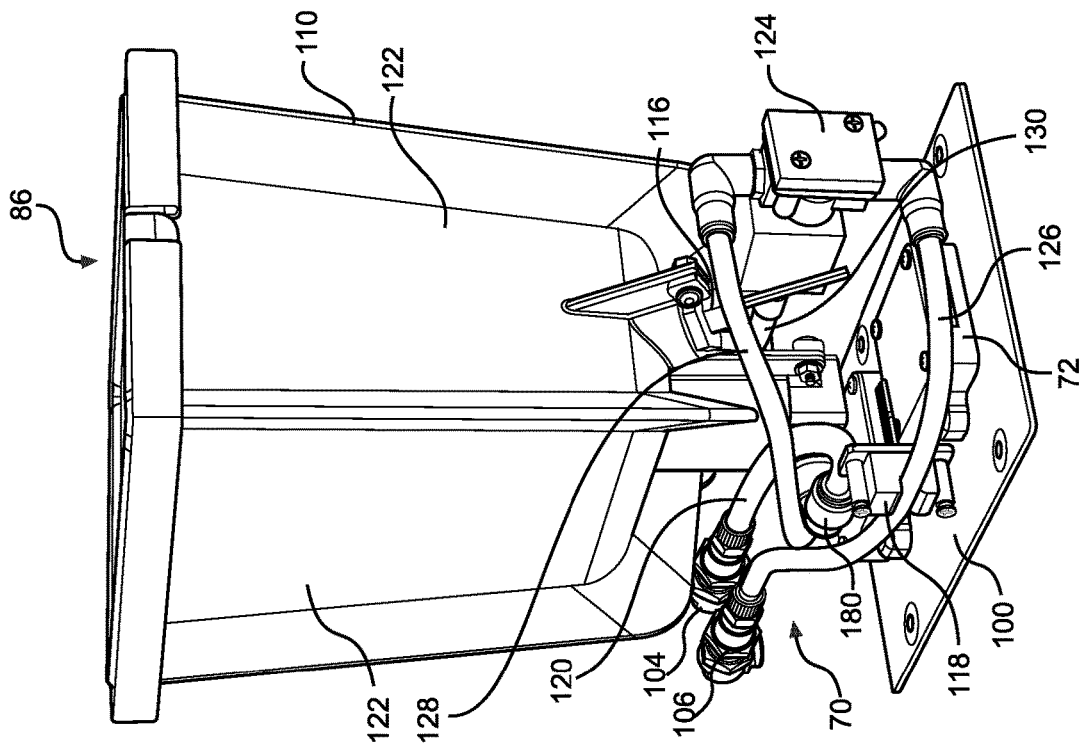

The root module 52 is configured to receive and hold the plants 64 (and the seeds from which the plants 64 are grown) in the plant growth system 50. Generally speaking, and with reference to FIG. 2, the root systems 78 of the plants 64 extend downward from the root/shoot interface 76 into the root chamber 66, and the shoot systems 80 of the plants 64 extend upward and outward from the root/shoot interface 76.

The sensors 68 are used to monitor conditions associated with the root module 52 such as, for example, the temperature in the root chamber 66, fluid levels in the root chamber 66, fluid flows to and from the root chamber 66, and the like. The sensors are coupled to the controller 54 and provide information regarding these parameters to the controller.

It should be appreciated that the sensors 68 can include any of a number of suitable sensors. Examples of suitable sensors include temperature sensors, flow sensors, bubble detectors, light sensors, pressure sensors, fluid level sensors, and the like. In general, any suitable sensors can be used with the root module 52 to provide any desired information about any aspect of the plant growth or operation of the root module 52.

It should also be appreciated that additional sensors besides those associated with the root module 52 can be included as part of the plant growth system 50. For example, sensors such as any of those described above as well as other sensors commonly used in plant growth systems, can be used to monitor and control the liquid source 56, the pump 58, the power source 60, the imaging system 62, and the like.

The plumbing 70 is used to provide fluid flow in the root module 52. The plumbing 70 can include various components such as tubing, valves, connectors, and the like. The plumbing 70 is coupled to and in fluid communication with the liquid source 56 and the pump 58 to facilitate fluid flow from the liquid source 56 to the root chamber 66 where the liquid is absorbed by the root systems 78 of the plants 64.

The light source 72 can have a variety of configurations and be used for a variety of purposes. In some embodiments, the light source 72 is a root-imaging light source that can be used to illuminate the interior of the root module 52 and/or the interior of the root chamber 66. In these embodiments, the root-imaging light source is separate and distinct from a light source used to facilitate photosynthesis and plant growth. The difference between the two is that the root-imaging light source produces light having a wavelength or range of wavelengths that is better suited for capturing images than the wavelength or range of wavelengths used to facilitate photosynthesis.

In some embodiments, the light source 72 is a plant-growth light source used to facilitate photosynthesis and plant growth. In these embodiments, the light source 72 can be positioned to provide maximal light to the plant shoots 80. It should also be appreciated that, in some embodiments, the light source 72 can also include both a root-imaging light source and a plant-growth light source.

The liquid source 56 can be used for any suitable purpose associated with growing the plants 64. For example, the liquid source 56 can include a source of water, nutrients, or the like that are used to facilitate growth of the plants 64. In general, the liquid source 56 serves as a reservoir of liquid that is used to facilitate growth of the plants 64.

The liquid source 56 can include any suitable liquid that is useful for growing the plants 64. In some embodiments, the liquid source 56 includes an aqueous solution or nutrient solution configured to provide the required water and/or nutrients to the plants 64. For example, the liquid source 56 can include nutrients such as nitrogen, phosphorus, potassium, and the like. In other embodiments, the liquid source 56 can consist of only water or consist essentially of water.

The liquid source 56 can include any suitable physical components capable of receiving and storing liquid used in association with the plant growth system 50. In some embodiments, the liquid source 56 includes a container or reservoir made of any suitable material such as plastic, metal, glass, composites, or the like. For example, the liquid source 56 can include a collapsible plastic container from which liquid can be drawn and to which liquid can flow. The liquid source 56 can be coupled to the root module 52 using tubing or any other suitable components or structure. In general, the liquid source 56 is capable of providing and receiving liquid in a microgravity environment.

The pump 58 can be used to transfer fluid as needed in the plant growth system 50. For example, the pump 58 can be used to transfer fluid between the root module 52 and the liquid source 56. In some embodiments, the pump 58 can be used to transfer fluid from the liquid source 56 to the root module 52 and, specifically, the root chamber 66. The pump 58 can also be used to transfer fluid from the root module 52 to the liquid source 56.

It should be appreciated that the pump 58 in FIG. 1 can represent a single pump or two or more pumps. For example, one pump can be used to transfer liquid as part of a hydroponic system and another pump can be used to transfer liquid as part of an aeroponic system.

It should also be appreciated that the pump 58 can include any suitable type of pump. For example, the pump 58 can be any suitable type of positive displacement pump, centrifugal pump, or axial flow pump. In general, the pump 58 should be capable of converting energy, typically electrical energy, into mechanical action that moves fluids in the plant growth system 50.

In some embodiments, the pump 58 is coupled to the liquid source 56 and the plumbing 70 of the root module 52 using any suitable tubing capable of conveying fluids. The pump 58 can be configured to pump liquid to and from the liquid source 56 to the root chamber 66 through the plumbing 70.

The power source 60 can be used to provide power to operate the plant growth system 50 in a microgravity environment. For example, the power source 60 can be used to provide power to the controller 54, the pump 58, the imaging system 62, the sensors 68, the light source 72, and any other components or systems that need power to operate.

The power source 60 can have any of a number of suitable configurations. In some embodiments, the power source 60 can be dedicated to only providing power for the plant growth system 50. For example, the power source 60 can be a solar panel, battery, or other device configured to convert chemical reactions, solar energy, or mechanical motion into electrical energy.

In other embodiments, the power source 60 can be shared by the plant growth system 50 with one or more other components. For example, the power source 60 can be the power source of a larger vessel such as the International Space Station or any other spacecraft, crewed or uncrewed. In some embodiments, the power source 60 can be a solar panel, battery, or other device configured to provide power to a large number of components one of which includes the plant growth system 50.

The controller 54 can be used to control the overall operation of the plant growth system 50. In some embodiments, this includes receiving information from the sensors 68, controlling fluid flow with the pump 58, and/or controlling illumination of the root module 52 and/or the plant 64 with the light source 72.

The controller 54 can include any suitable hardware capable of performing the above functions or otherwise controlling operation of the plant growth system 50. For example, the controller 54 can include a processor, memory, data storage device, input/output interfaces, power supply unit, display, and the like.

In some embodiments, a unique IP address can be assigned to each component in the system by the controller 54 or other device to create a modular and scalable system. Components can be added, removed, or replaced with no consequence to the control functionality.

In some embodiments, the hardware for the controller 54 may have undergone prior spaceflight qualification testing before being used as part of the plant growth system 50. In some embodiments, a centralized controller 54 can be used to control the plant growth system 50 to ensure optimum plant growth conditions. In some embodiments, the controller 54 can provide remote monitoring and control capability.

In some embodiments, the controller 54 is external to the root module 52 and configured to connect to the root module 52 using a suitable data connection. In other embodiments, the controller 54 can be part of the root module 52. It should be appreciated that the controller 54 can also represent a single controller or multiple controllers. For example, one controller can be positioned external to the root module 52, and another controller can be included with the root module 52. The two controllers can be configured to communicate with each other or can be separate and unable to communicate with each other.

It should also be appreciated that the controller 54 can be part of a larger control system used to control other components and systems. For example, the controller 54 can be part of a control system for a space station or other spacecraft. It should be noted that in these situations the plant growth system 50 can also include one or more other controllers that can communicate with or be separate from a controller that is part of the space station or spacecraft.

The imaging system 62 can be used to monitor growth of the plants 64 and especially the growth of the root systems 78 of the plants 64. The imaging system 62 can include an imaging device 82 configured to take images or video of various aspects of the plant growth system 50 including the root systems 78 in the root chamber 66.

The imaging device 82 can be any suitable device capable of taking images and/or video. Examples of such devices include cameras and the like. In some embodiments, the imaging device 82 includes an image sensor and is configured to produce digital images of the root systems 78 of the plants 64 that are processed (optional) and saved in memory.

It should be appreciated that numerous changes can be made to the plant growth system 50. For example, the plant growth system 50 can be modified to include a variety of additional components or elements. Likewise, the existing components and/or new components can be arranged in a different manner than is shown in FIG. 1. For example, the system 50 can include multiple light sources configured in a variety of ways—e.g., a light source may be positioned external to the root module and the light source 72 can be positioned internal to the root module 52. Numerous variations are possible.

FIGS. 3-4 show one embodiment of a root module 52 including a housing 84 (alternatively referred to as a cabinet) coupled to and supporting a root chamber 86. The housing 84 is configured to support the root chamber 86 in an elevated position to allow space underneath the root chamber 86 for the various other components in the root module 52 such as the plumbing 70, the sensors 68, the light source 72, and the like.

The housing 84 has a generally rectangular shape and includes a front wall 90, a rear wall 92, a first sidewall 94, a second sidewall 96, and a base 100. The front wall 90 and the rear wall 92 are positioned on opposite sides of the housing 84. The first sidewall 94 and the second sidewall 96 are also positioned opposite sides of the housing 84. The walls 90, 92, 94, 96 and the base 100 can be coupled together using any suitable fastening method or technique including by way of fasteners 98 shown in FIGS. 3-4.

The housing 84 includes a number of viewing areas 88 (alternatively referred to as viewing windows) through which the root chamber 86 is visible. In some embodiments, the viewing areas 88 are openings that are not covered and allow full access to the root chamber 86. In other embodiments, the viewing areas 88 can be covered with a transparent material through which the root chamber 86 is visible.

The housing 84 also includes a number of interface ports that can be used to couple external components of the plant growth system 50 to the internal components of the root module 52. In some embodiments, the interface ports include a data/power connection port 102, a first fluid port 104, and a second fluid port 106. It should be appreciated that the ports 102, 104, 106 can have any suitable configuration. For example, the fluid ports 104, 106 can be quick connect ports to which fluid lines can quickly and easily attach.

The first fluid port 104 can be used to provide higher pressure fluid to spray onto the root systems 78 in the root chamber 86 in accordance with and as part of the operation of an aeroponic system. The second fluid port 106 can be used to provide lower pressure fluid to fill and drain the interior of the root chamber 86 in accordance with and as part of the operation of a hydroponic system.

It should be appreciated that the housing 84 can be modified in a number of ways compared to what is shown in FIGS. 3-4. It should also be appreciated that it can have any suitable shape, size, or configuration and be made of any suitable material. For example, the housing 84 can have other shapes besides a rectangular shape. Likewise, the housing 84 can be made of a variety of materials including metal, plastic, wood, composites, a combination of any of these, or the like.

The root chamber 86 includes a main body 110, a root/shoot interface 108 coupled to the main body 110, and lifting straps 112. In some embodiments, the root chamber 86 is permanently fastened to the housing 84. In other embodiments, the root chamber 86 is configured to be received and removed through the top of the housing 84. The root chamber 86 can be coupled to and/or held in place with respect to the housing 84 using any suitable fastening technique or method. For example, the root chamber 86 can be coupled to the housing 84 with readily releasable fasteners such as hook and loop fasteners.

The lifting straps 112 are provided to make it easier to remove the module 52 from the integrated system. In some embodiments, the lifting straps 112 can be used to remove the root module 52 by lifting it upward and out of the top of the integrated system as well as to install the root module 52 by lowering it downward and into the top of the integrated system.

The main body 110 can be a container that is open at the top and configured to form the primary housing for the root systems 78 of the plants 64 as they grow in a microgravity environment. The main body 110 includes openings (described in detail below) to allow fluid transport into and out of the root chamber 86.

In some embodiments, the main body 110 includes a transparent wall area 122 through which an interior of the root chamber 86 is visible. The imaging system 62 can be configured to take images of the interior of the root chamber 86 through the transparent wall area 122. In some embodiments, the entire main body 110 is made of a transparent material making it possible to view the interior of the root chamber 86 from any side. Examples of transparent materials that can be used to make the main body 110 include Somos WaterShed plastic materials, available from DMS Somos, Elgin, IL It is a low viscosity liquid photopolymer that forms a true, clear, engineered plastic when cured. Another example is Accura 60 plastic, available from 3D Systems, Rock Hill, SC It is a transparent, polycarbonate-like clear plastic when cured.

The main body 110 can be made using any suitable technique. In some embodiments, the main body 110 is 3D printed using any of the materials described above. 3D printing provides a number of advantages including the ability to make complex geometries quickly and relatively inexpensively. In some embodiments, the main body 110 can be made entirely by 3D printing. In other embodiments, a portion of the main body 110 can be made by 3D printing and other portions can be made using other manufacturing methods or techniques.

The root/shoot interface 108 is configured to receive and hold seeds and/or plants at various stages of growth. The root systems 78 of the plants 64 extend downward from the root/shoot interface 108 into the root chamber 86, and the shoot systems 80 of the plants 64 extend upward and outward from the root/shoot interface 108. The details of the root/shoot interface 108 are described below.

The main body 110 and the root/shoot interface 108 can be coupled together in any suitable manner using any suitable fastening techniques or components. In some embodiments, the root/shoot interface 108 is coupled to the main body 110 using quick release fasteners 114. The quick release fasteners 114 can be operated by rotating an upper portion to selectively lock or release the fasteners 114 and allow the root/shoot interface 108 to be coupled or uncoupled from the main body 110.

In some embodiments, the root/shoot interface 108 and the main body 110 are coupled together in a fluid tight manner. A fluid tight connection is often a requirement in a microgravity environment due to the desire to prevent fluids from escaping the root chamber 86 into the surrounding area and contacting sensitive equipment.

FIGS. 5-8 show perspective views of the root module 52 with the root/shoot interface 108 and the walls 90, 92, 94, 96 removed to illustrate the interior components. The root module 52 includes two light sources 72 coupled to a top surface of the base 100. The light sources 72 can be configured to illuminate the interior of the root module 52.

Figure 9:
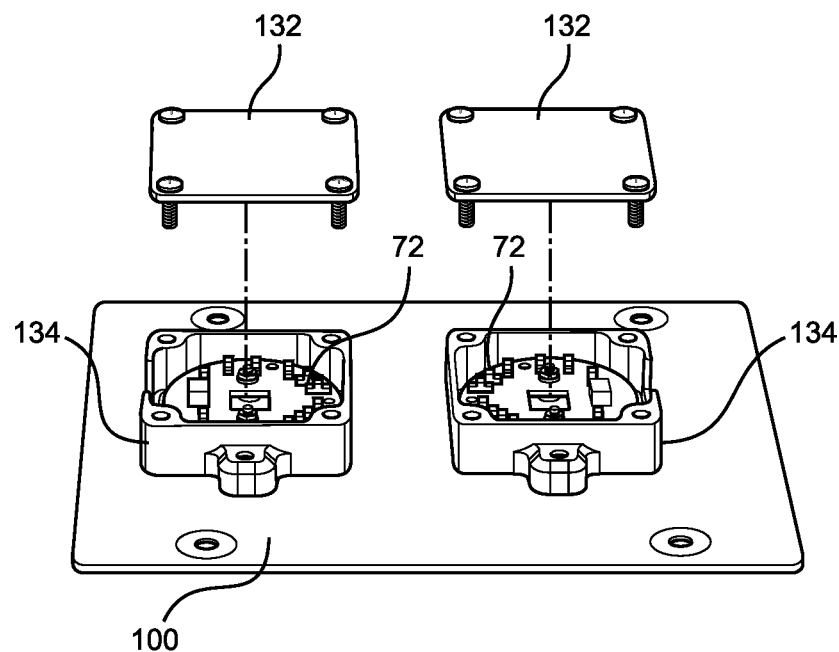
FIG. 9 is a perspective view of one embodiment of light sources configured to illuminate the interior of the root module including the root chamber.

FIG. 9 shows the light sources 72 in greater detail. The light sources can each include a cover 132 coupled to a housing 134. The cover 132 can be transparent or translucent to allow light emitted by the LED elements to pass through and illuminate the interior of the root chamber 86.

It should be appreciated that any suitable type of light can be used as the light sources 72. In some embodiments, the light sources 72 include LED lights configured to provide white light having a color temperature of 3500 K to 6000 K. The light sources 72 can also be configured to provide a variety of other colors and/or wavelengths of light including red, green, ultraviolet light, and the like.

Power for the light sources 72 can be provided by the data/power connection 102 or by a separate internal power source such as one or more batteries. It should be noted that the power and data connection wires inside the root module 52 are not shown in FIG. 5-8 to better illustrate the other components.

FIGS. 5-8 show the plumbing 70 in the root module 52 in greater detail. The first fluid port 104 provides fluid for the aeroponic system and is in fluid communication with a spray nozzle inside the root chamber 86 by way of tubing 120 (alternatively referred to as a fluid line). In general, the first fluid port 104 is configured to provide higher pressure fluid to the root module 52.

The second fluid port 106 is configured to provide fluid for the hydroponic system and a clearing system used to clear an interior surface of the transparent wall area 122 of the root chamber 86. The second fluid port 106 is coupled to a valve 124 by way of tubing 126 (alternatively referred to as a fluid line). The valve 124 is configured to direct the fluid to tubing 128 (alternatively referred to as a fluid line) which leads to the interior surface of the transparent wall area 122 or to tubing 130 (alternatively referred to as a fluid line) which leads to the bottom of the main body 110 where it can be used to fill and drain the interior of the root chamber 86.

The root module 52 includes a number of sensors 68 such as a temperature sensor 116 and a bubble detector 118. The temperature sensor 116 is used to measure the temperature in the root chamber 86 and communicate this information to the controller 54. The temperature sensor 116 extends through the bottom of the main body 110 into the interior of the root chamber 86.

It should be appreciated that the temperature sensor 116 can have any suitable configuration and can be any suitable type of temperature sensor. In some embodiments, the temperature sensor 116 includes a thermocouple.

The bubble detector 118 is used to detect bubbles or air in the tubing 126. The presence or absence of bubbles or air in the tubing 126 can be used by the controller 54 to determine when to shut off operations such as filling or draining the interior of the root chamber 86. In general, it is desirable to avoid removing too much air from the interior of the root chamber 86. It should be appreciated that the bubble detector 118 can be any suitable bubble detector. In some embodiments, the bubble detector 118 is an ultrasonic bubble detector.

Figure 10:
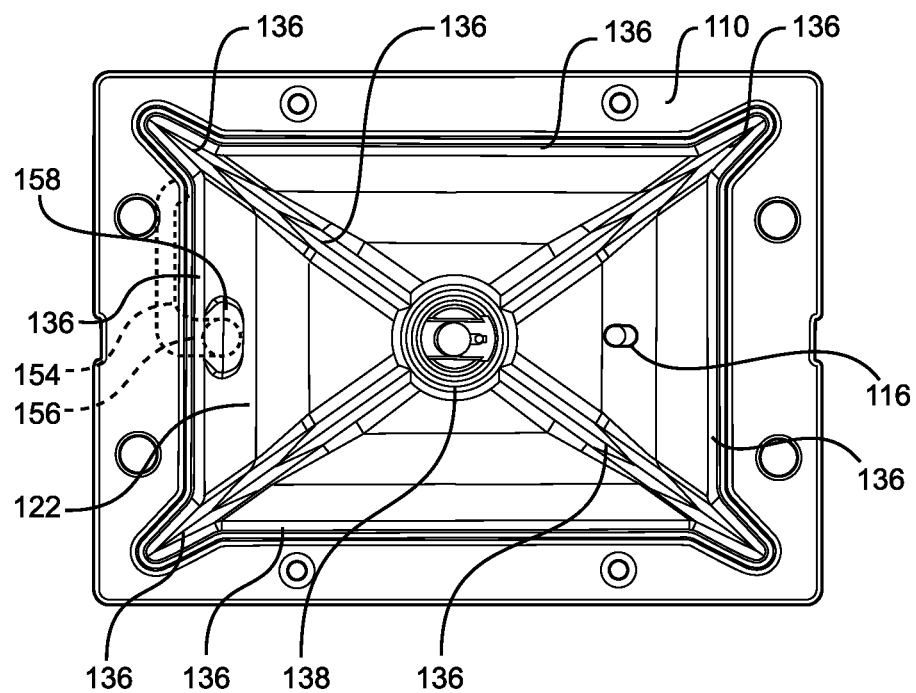
FIG. 10 is a top view of one embodiment of a main body of a root chamber for the root module in FIG. 3.

FIG. 10 is a top view of the main body 110 of the root chamber 86. The root chamber 86 can include capillary channels 136 positioned horizontally at the interface between the main body 110 and the root/shoot interface 108, positioned vertically along the corners of the main body 110, and positioned approximately horizontally along the bottom of the main body 110. The capillary channels 136 converge to a capillary collection area 138 positioned in the center of the main body 110.

The capillary channels 136 are sized and shaped to use capillary forces and/or surface tension to cause liquid such as water or aqueous solutions to flow to the capillary collection area 138 without the assistance of external forces such as gravity. The capillary channels 136 use capillary forces and/or surface tension to position and transport liquids due to the absence of hydrostatic pressure in a microgravity environment. On earth, the effect of capillary forces is limited to a few millimeters. In a microgravity environment, capillary forces affect free surfaces that extend meters.

It should be appreciated that the capillary channels 136 can have any suitable geometry that facilitates capillary flow in the root chamber 86. Examples of suitable geometries include grooves, parallel plate channels, conduits, and the like. The capillary channels 136 can be used in corners, along-side walls, at the interface between two components, and/or along flat surfaces.

In some embodiments, such as those shown in FIG. 10, the capillary channels 136 can be grooves positioned in the interior corners and along the bottom of the main body 110 or formed when the root/shoot interface 108 and the main body 110 are coupled together. In some embodiments, the capillary channels 136 can have a roughly open wedge shape. The sidewalls forming the wedge can be flat or planar, have a rounded shaped, or have an irregular shape. In some embodiments, the wedge shape is open approximately 5° to approximately 25° or approximately 10° to approximately 20°.

Figures 12, 13:
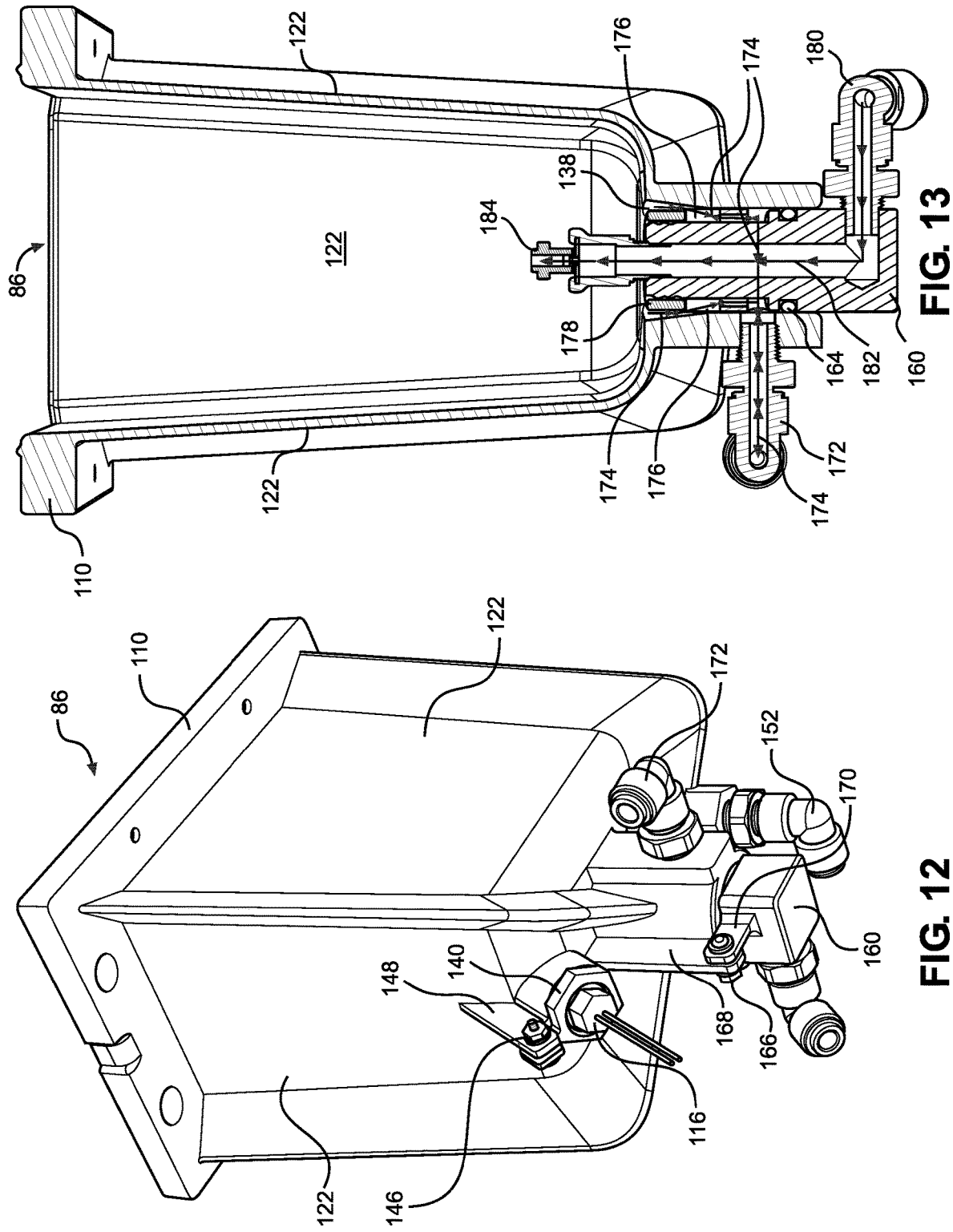
FIG. 13 is a front cross-sectional view of the main body in FIGS. 11-12 showing fluid flow channels to and from the root chamber.
Figure 14:
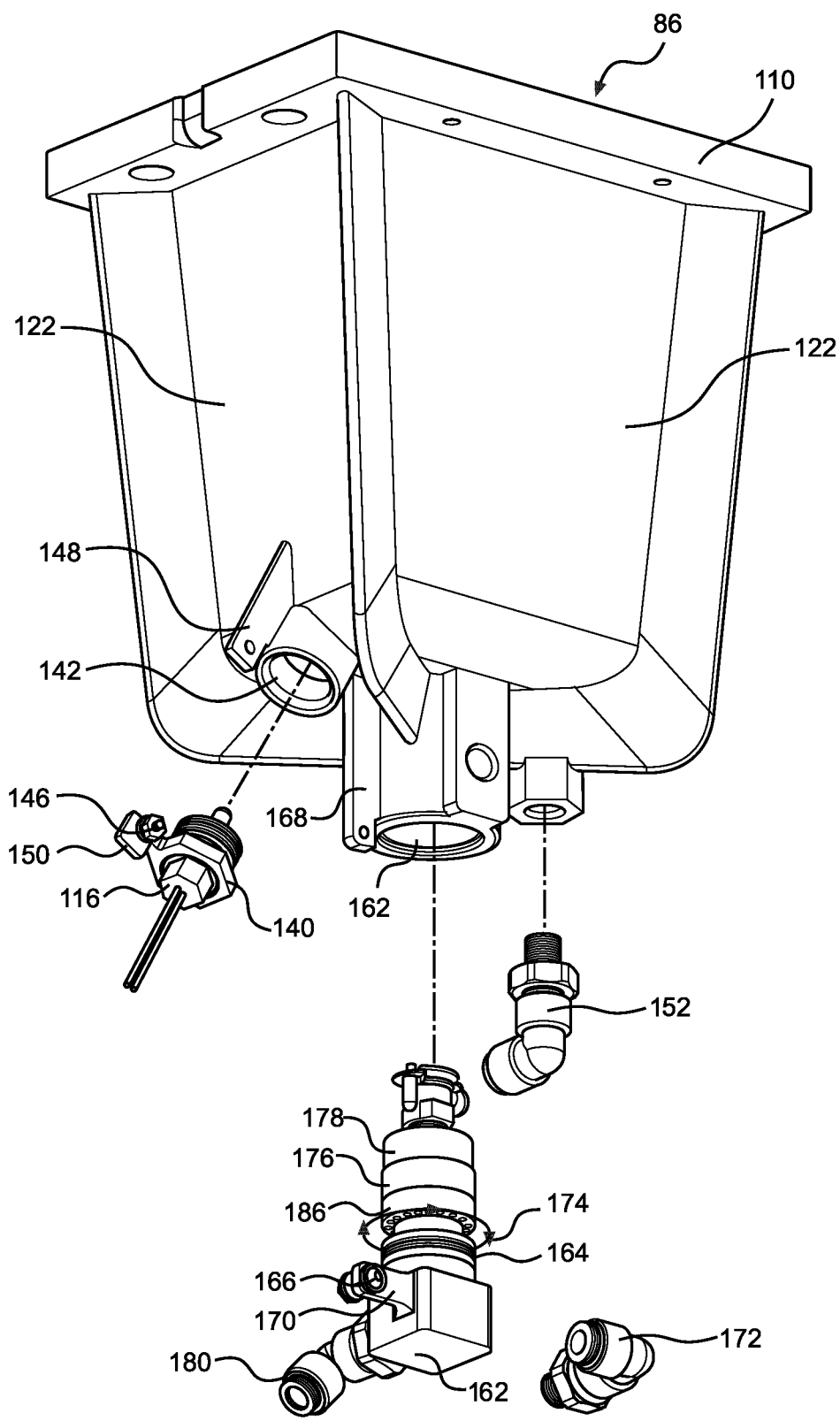
FIG. 14 is an exploded view of the main body in FIGS. 11-12 showing the plumbing fixtures through which fluid travels to and from the root chamber.

FIGS. 11-14 show the manner that the temperature sensor 116 and the various fluid flow channels enter the root chamber 86 through the main body 110. The temperature sensor 116 is threaded into an insert 140 which is configured to be positioned in a corresponding opening 142 in the bottom of the main body 110. A seal 144 such as an O-ring made of an elastomeric material is provided around the outer circumference of the insert 140 and configured to form a fluid tight connection with the opening 142 in the main body 110. As shown in FIGS. 12 and 14, the insert 140 can be held in place by a fastener 146 extending through an opening in a tab or projection 148 extending outward from the bottom of the main body 110 and a corresponding opening in a tab or projection 150 extending outward from the insert 140.

It should be appreciated that the temperature of the root chamber 86 can be measured using other configurations of the temperature sensor 116. For example, in some embodiments, the main body 110 can include a recess that does not penetrate the main body 110. The temperature sensor 116 can extend into the recess and measure the temperature of the root chamber 86 through the walls of the recess. Numerous other configurations are also possible.

Figure 11:
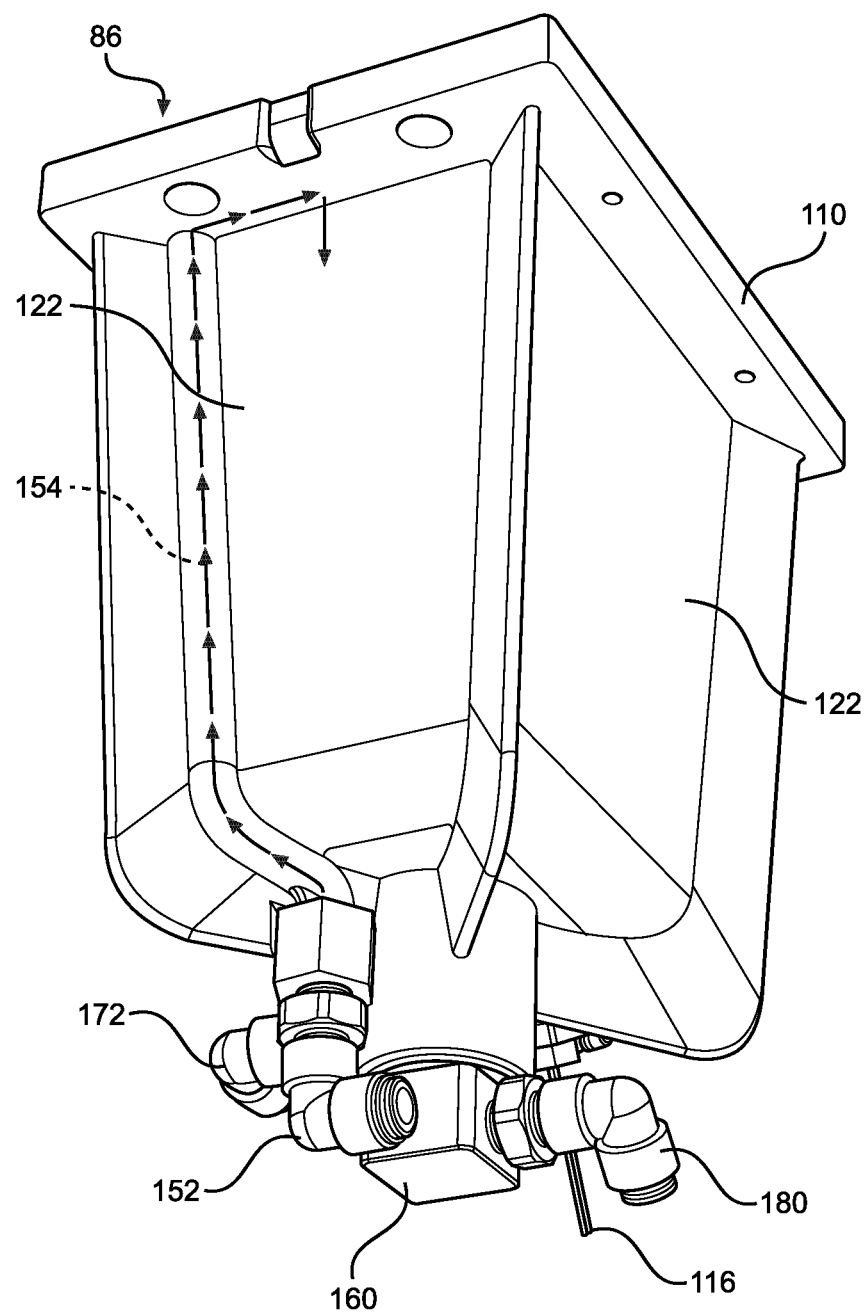
FIGS. 11-12 are perspective views of the main body in FIG. 10 showing the manner that the fluid lines connect to the main body.

FIGS. 10-11 illustrate the flow of liquid used to clear the viewing window. The fluid flows through a channel or fluid pathway formed by the tubing 128, plumbing fittings 152, internal channel 154 in the wall of the main body 110, and out an outlet port 156 at the top of the interior surface of the transparent wall area 122. The outlet port 156 is directed downward from a protrusion 158 that extends outward from the interior surface of the transparent wall area 122.

In some embodiments, the outlet port 156 is configured to produce a laminar flow of liquid over the internal surface of the transparent wall area 122. Laminar flow reduces distortion of light passing through the viewing window making it easier to see details and take clearer images of the interior of the root chamber 86. The internal channel 154 can be formed as part of the 3D printing process.

It should be appreciated that numerous modifications can be made to the fluid flow channel used to clear the viewing window. For example, the internal channel 154 can be replaced by tubing extending upward along the outer surface of the main body 110 and terminating at a fitting extending through an opening at the top the transparent wall area 122. The fitting can be configured to direct liquid flow over the transparent wall area 122. Likewise, the liquid can exit the outlet port 156 and flow through a distributor that divides the flow and distributes it across the top of the transparent wall area 122.

FIGS. 12-14 show fluid flow through the hydroponic and aeroponic systems. An insert 160 is configured to be positioned in a corresponding opening 162 in the center of the bottom of the main body 110. A seal 164 such as an O-ring made of an elastomeric material is positioned around the insert 160 to form a fluid tight connection with the opening 162 in the main body 110. The insert 160 can be held in place by a fastener 166 extending through an opening in a tab or projection 168 extending outward from the bottom of the main body 110 and a corresponding opening in a tab or projection 170 extending outward from the insert 160.

Figure 15:
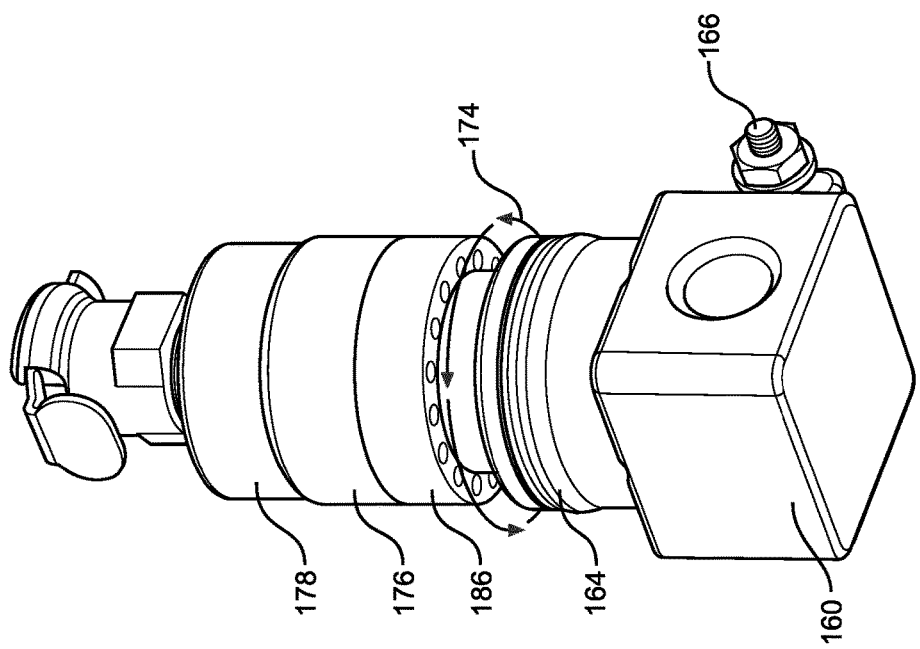
FIG. 15 is a perspective view of an insert configured to be placed in the bottom of a root chamber and including a first flow channel for fluid movement as part of a hydroponic system and a second flow channel for fluid movement as part of an aeroponic system.
Figure 18:
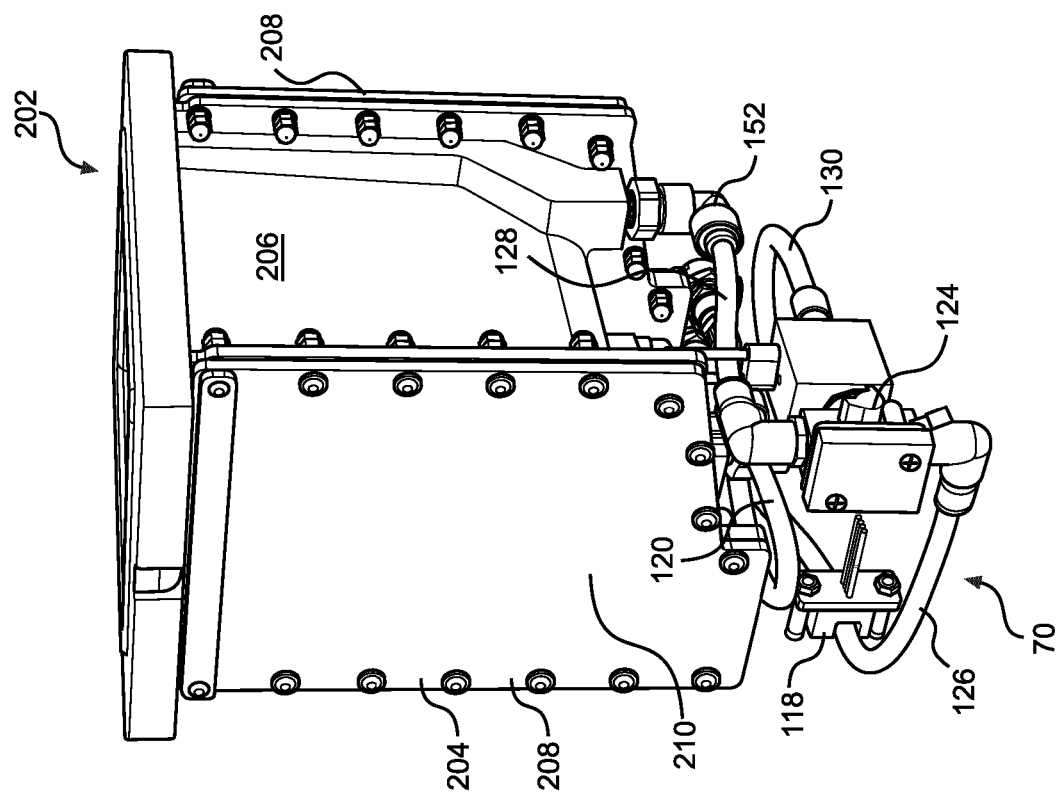
FIGS. 17-20 are perspective views of the root module in FIG. 16 with the outer walls of the housing and the root/shoot interface removed.
Figure 17:
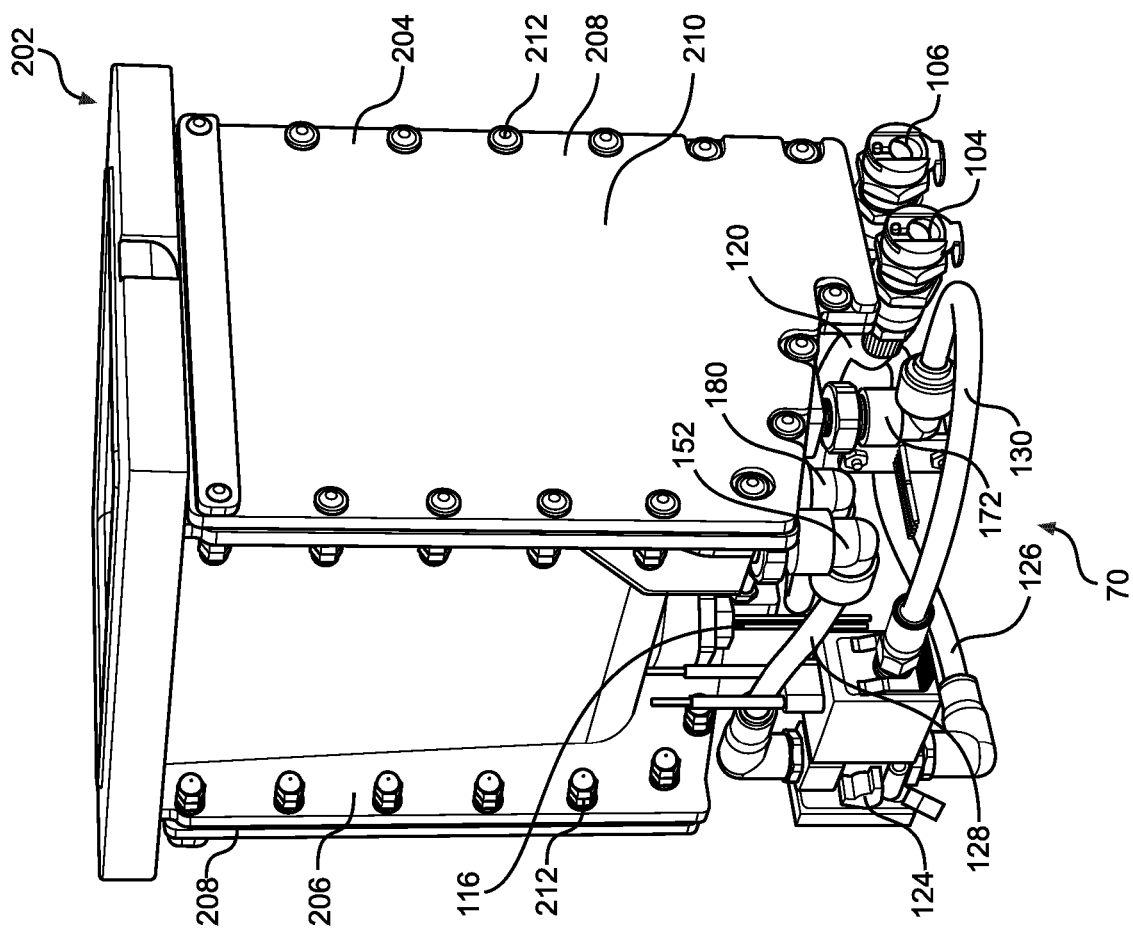
Figure 20:
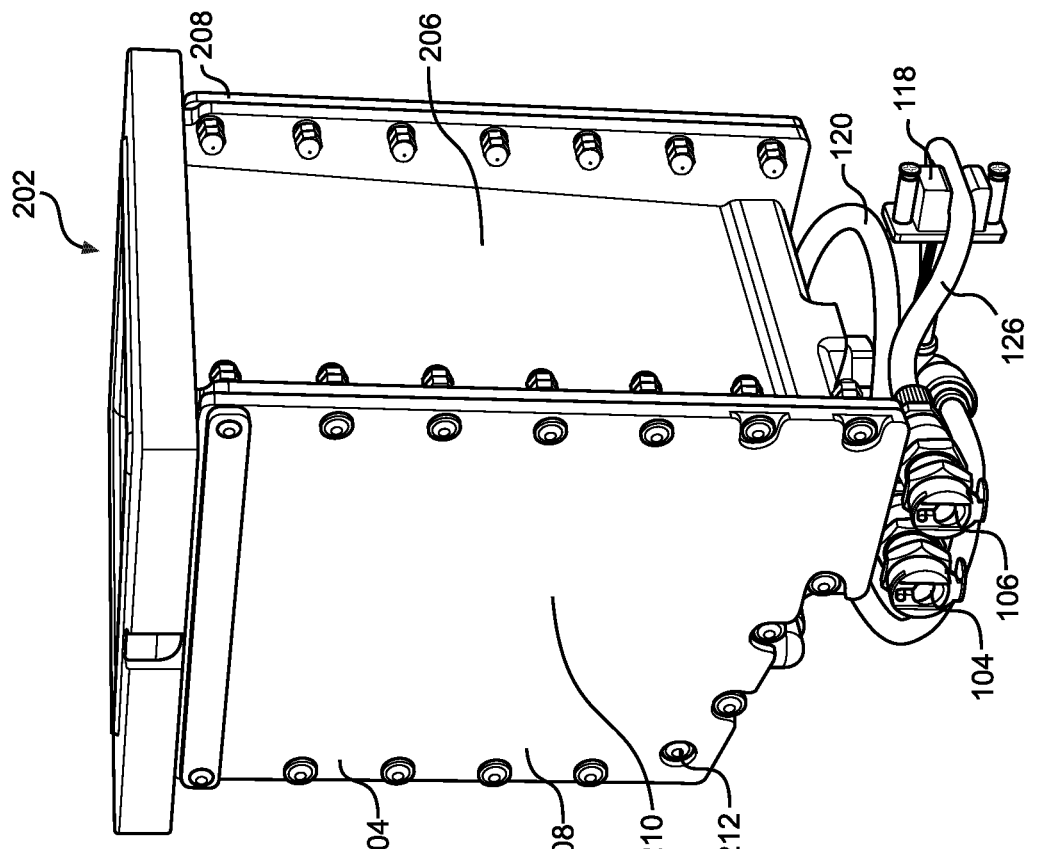
Figure 19:
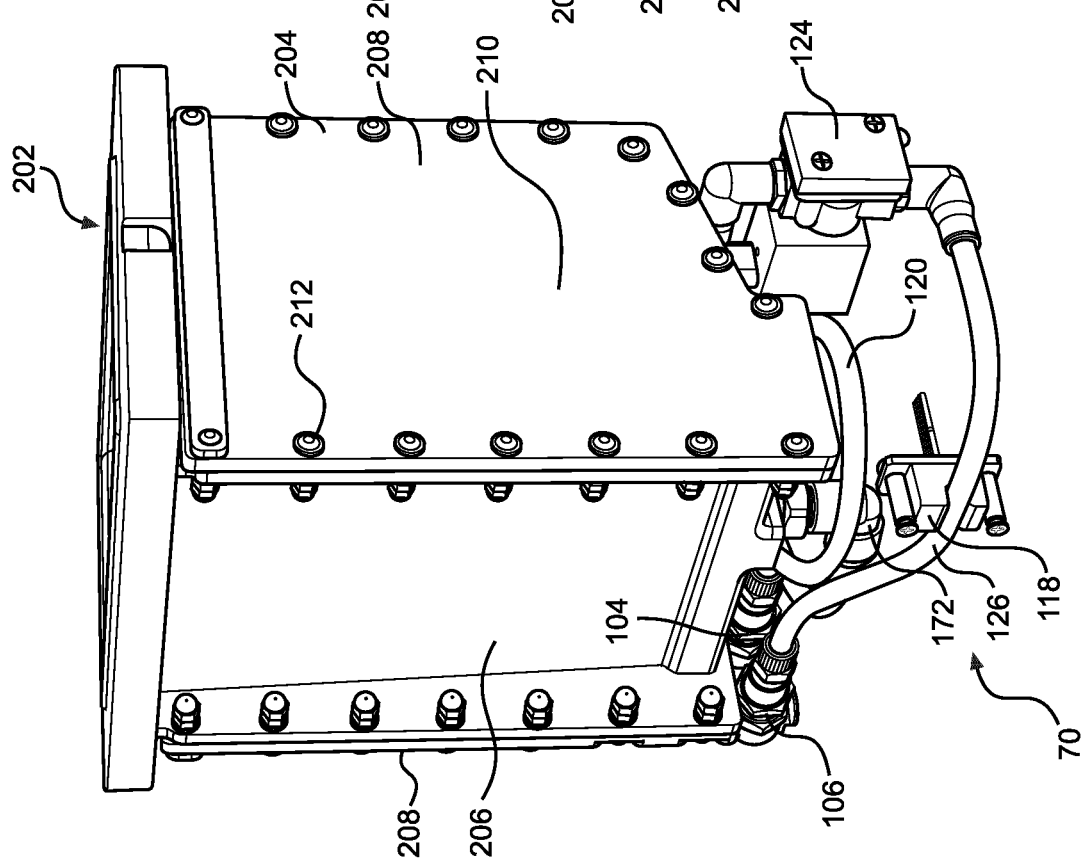

Fluid for the hydroponic system flows through a first flow channel or fluid pathway formed by the tubing 130, plumbing fittings 172, a channel 174 extending around an outside circumference of the insert 160, and a series of channels extending upward through a collar 186 positioned around the outside of the insert 160 (see FIG. 15). The flow channel enters the interior of the root chamber 86 through the capillary collection area 138. A filter or porous barrier 176 is positioned in the capillary collection area 138 to prevent roots and/or other debris from exiting the root chamber 86 through the first flow channel.

In some embodiments, the porous barrier 176 can be a porous collar having an annular shape and sized to fit around an outer surface of the insert 160. The porous barrier 176 can be held in place by a locking ring 178 that is threaded onto the top of the insert 160.

It should be appreciated that the porous barrier 176 can have any suitable configuration and be made of any suitable materials. For example, the porous barrier 176 can have other shapes besides an annular shape. Also, the porous barrier 176 can be made of a suitable material such as foam, plastic, metal, composites, and the like.

The hydroponic system can be used to fill and drain the interior of the root chamber 86. The interior can be filled and drained by pumping or otherwise transferring liquid into or out of the interior of the root chamber 86 through the first flow channel. In some embodiments, the hydroponic system is used to drain liquid added to the interior of the root chamber 86 by the aeroponic system. For example, liquid sprayed into the interior of the root chamber 86 as part of the operation of the aeroponic system can be removed by draining it through the first flow channel.

Fluid for the aeroponic system flows through a second flow channel or fluid pathway formed by the tubing 120, plumbing fittings 180, a channel 182 extending through the center of the insert 160, and a spray nozzle 184 positioned in the interior of the root chamber 86. The aeroponic system can be used to spray liquid from the liquid source 56 on to the root systems 78 of the plants 64. The liquid can be recovered by collecting it in the capillary collection area 138 and draining it through the first flow channel in the manner described above.

Figure 16:
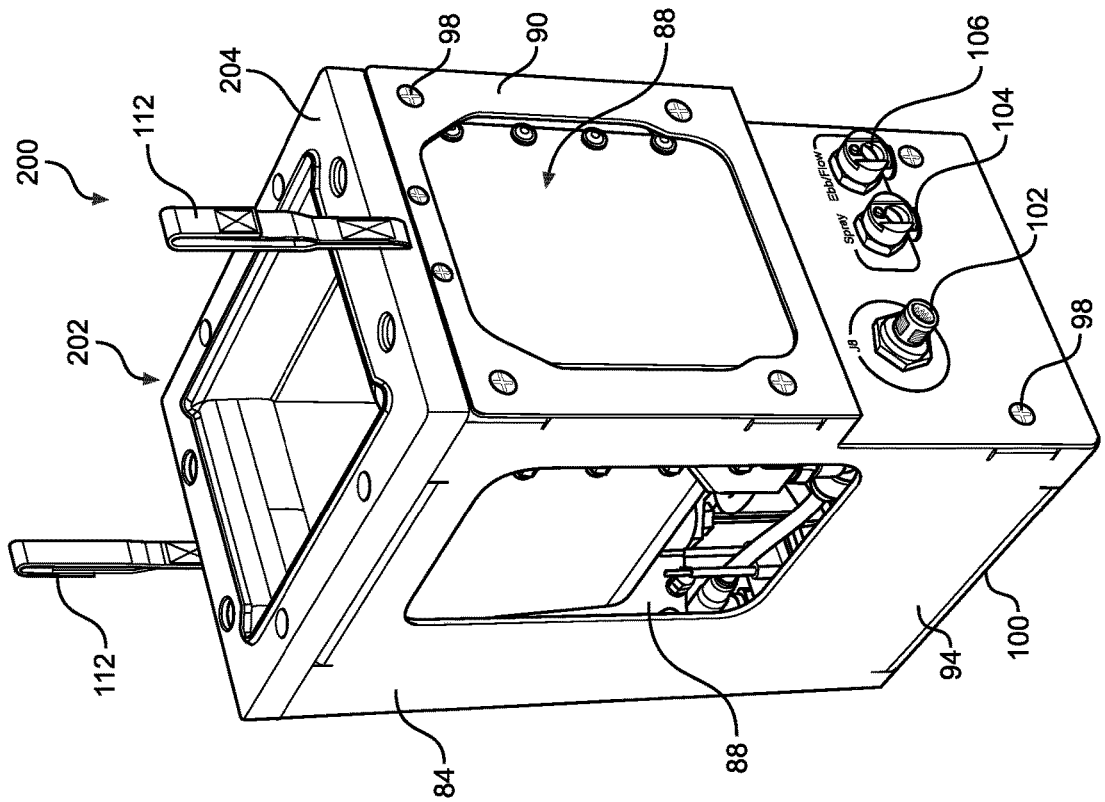
FIG. 16 is front perspective view of another embodiment of a root module that can be used with the plant growth system.

FIG. 16 shows another embodiment of the root module 200. This design is similar to and includes many of the same components as the design shown and described in connection with FIGS. 3-4. Accordingly, a description of the components that are common to both designs can be found above.

The main difference between the root module 52 and the root module 200 is the design of the main body of the root chamber. The root module 200 includes a main body 204 coupled to the root/shoot interface 108 and configured to form a root chamber 202. It should be appreciated that the root chamber 202 can have the same characteristics and functionality of the root chamber 86.

The main body 204 can be made by 3D printing a center or intermediate section 206 and coupling sidewalls 208 to the sides of the center section 206 with, for example, fasteners 212. A seal or gasket 214 (FIG. 22) can be positioned between the center section 206 and the sidewalls 208 to prevent liquid from escaping from the root chamber 202 in a microgravity environment.

The sidewalls 208 are preferably made of a transparent material and form one or more transparent wall areas 210 on the main body 204. The center section 206 can also be made of a transparent material including any of those described above. It should be appreciated that the main body 204 can include a combination of transparent and non-transparent components and/or areas. In some embodiments, only one of the sidewalls 208 is made of a transparent material and the other sidewall 208 and/or the center section 206 can be made of a non-transparent material.

The sidewalls 208 can have any suitable shape and be made of any suitable material. In some embodiments, the sidewalls 208 have a flat or planar shape. In some embodiments, the sidewalls 208 can be made of a transparent plastic material such as a polycarbonate material. In some embodiments, the sidewalls 208 can be made of any transparent material including any of those described above in connection with the transparent wall area 122.

In some embodiments, the transparent wall area 210 of the main body 204 faces the front wall 90 of the housing 84 of the root module 200. In this configuration, the viewing window provided by the transparent wall area 210 is on the front of the root module 200. It should be appreciated that in other embodiments the viewing window can be on the side or rear of the root module 200. In some embodiments, the root module 200 can include a viewing window on two or more sides.

Figure 22:
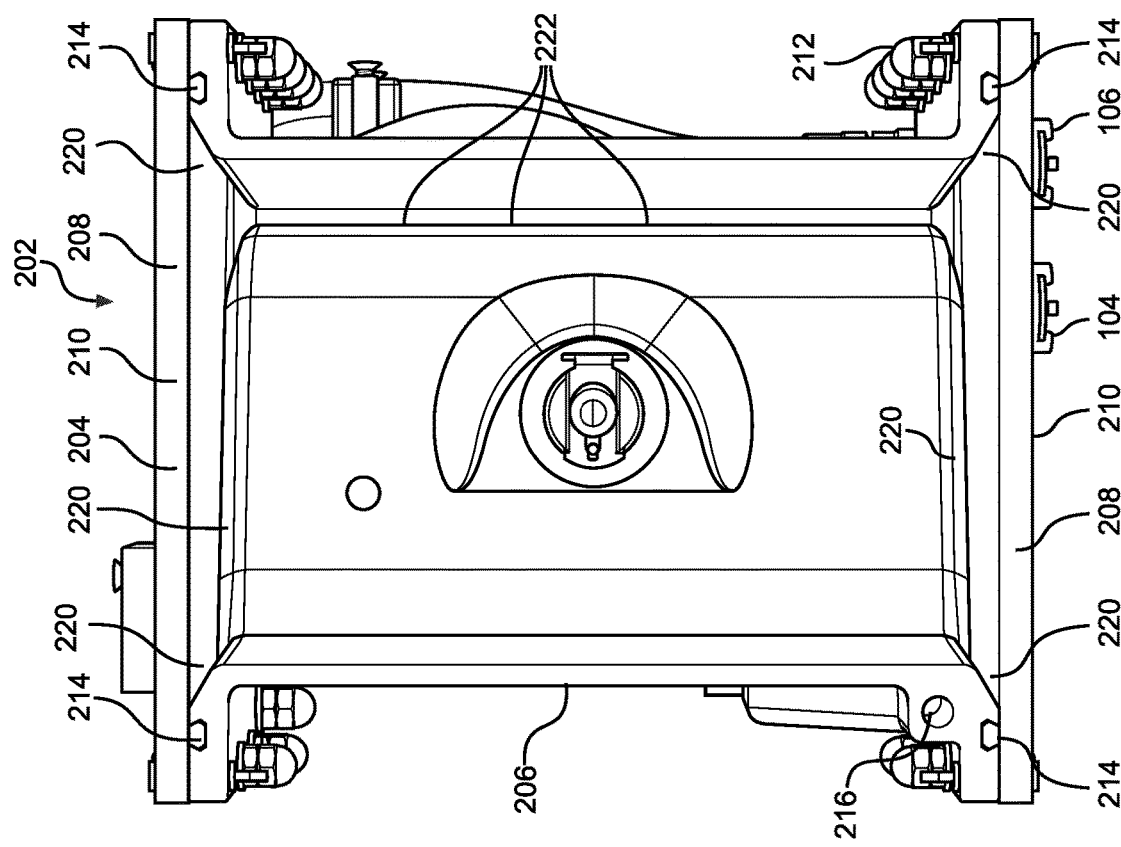
FIG. 22 is a top cross-sectional view of the main body in FIG. 21.
Figure 21:
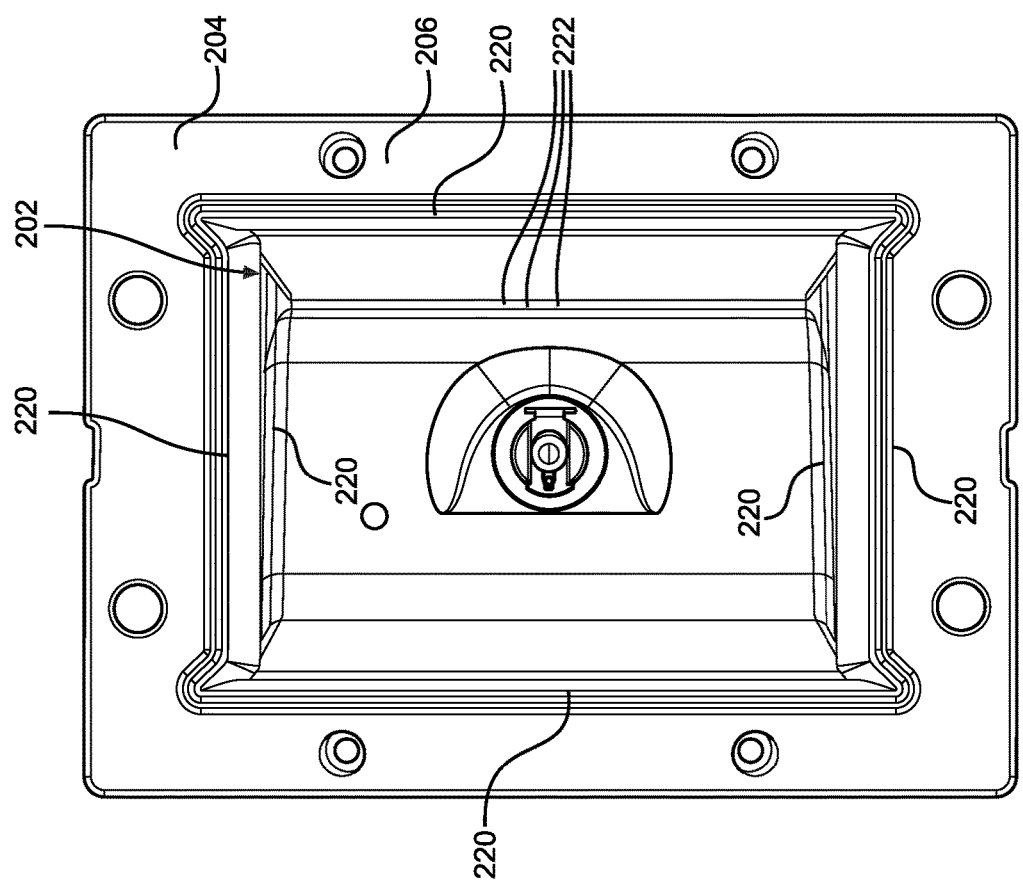
FIG. 21 is a top view of one embodiment of a main body of a root chamber for the root module in FIG. 16.

The interior of the root chamber 202 is shown in FIGS. 21-22. The root chamber 202 can include capillary channels 220, which are similar to the capillary channels 136 in the root chamber 86. The capillary channels 220 can be positioned at the junction or interface between the center section 206 and each of the sidewalls 208 and at the junction between the root/shoot interface 108 and the center section 206 and the sidewalls 208. The capillary channels 220 converge to a capillary collection area 222 positioned at the bottom of the main body 204.

The capillary collection area 222 is a capillary channel or drain channel extending across the bottom of the center section 206 between the sidewalls 208. The bottom of the center section 206 slopes downward toward the capillary collection area 222. The physical shape of the capillary channels 220 causes liquid to collect at the capillary collection area 222 in a microgravity environment where it can be collected.

It should be appreciated that the capillary channels 220 can be configured the same or similarly to the capillary channels 136 described above. Accordingly, the description of the capillary channels 136 is equally applicable to the capillary channels 220.

Figure 25:
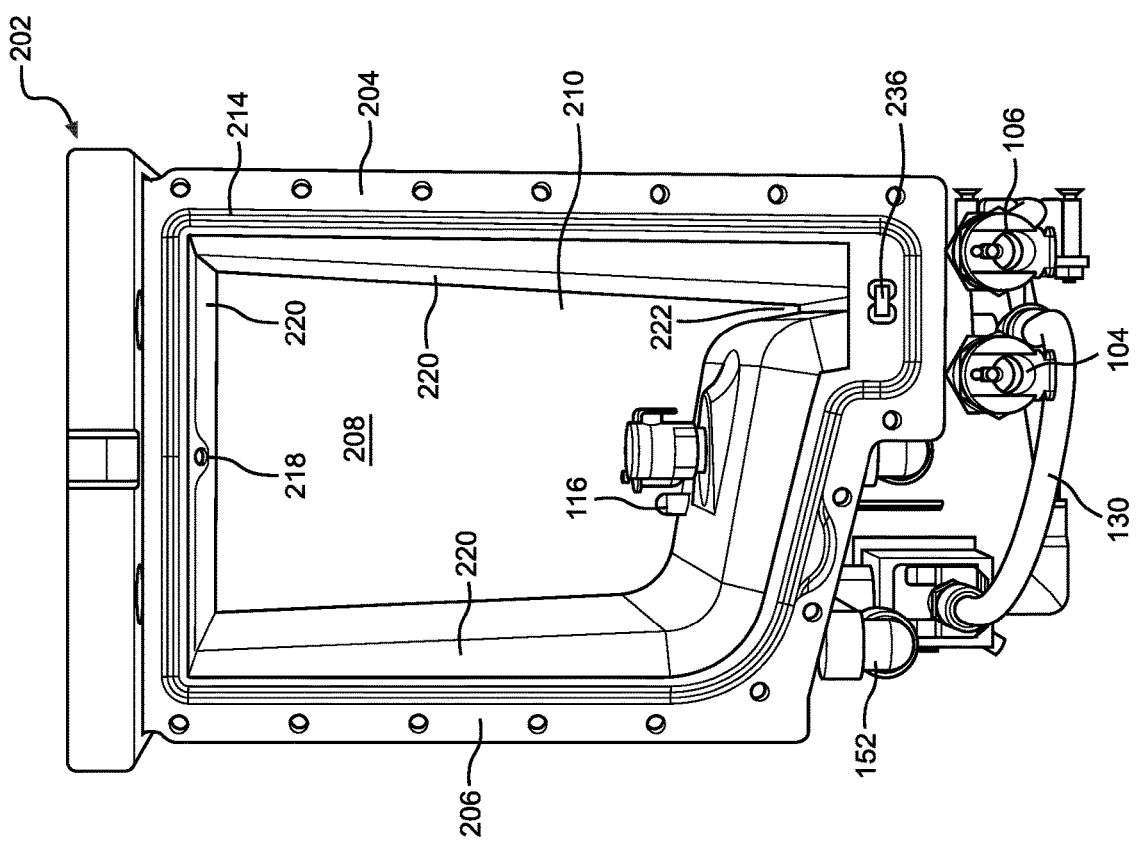
FIG. 25 is a side view of the main body in FIG. 21 with one of the sidewalls removed.
Figure 28:
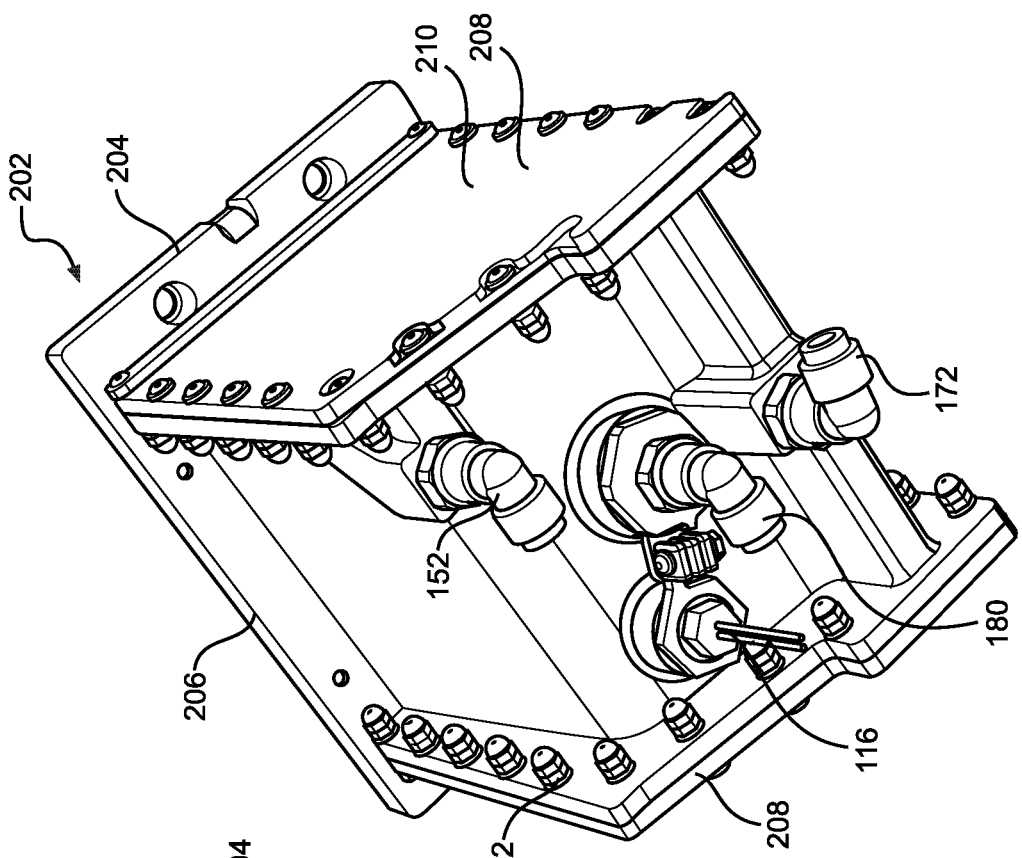
FIG. 28 is a bottom perspective view of the main body in FIG. 21 showing the manner that the fluid lines connect to the main body.
Figure 27:
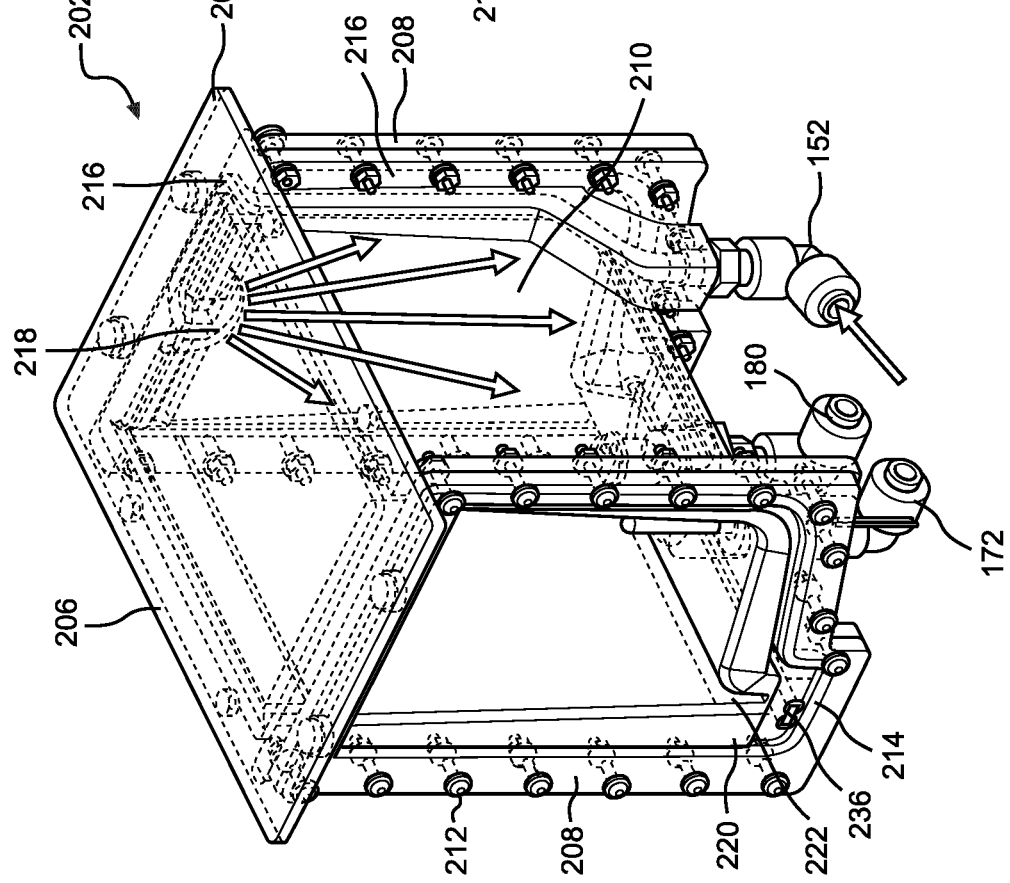
FIG. 27 is a perspective, partially transparent view of the main body in FIG. 21 showing fluid flow pathways associated with the root chamber.

The plumbing 70 for the root module 200 is largely the same or similar to the plumbing 70 for the root module 52. In general, the plumbing 70 defines a flow channel for liquid used to clear the viewing window using largely the same components described above. The liquid passes through the tubing 128, plumbing fixtures 152, and enters an internal channel 216 extending upward along the side and across the top of the center section 206 of the main body 204 (FIGS. 22, 25, and 27), and exits through an outlet port 218 at the top of the internal surface of the transparent wall area 210.

In some embodiments, the internal channel 216 is formed as part of 3D printing the center section 206. It should be appreciated that the configuration of the plumbing 70 used to clear the viewing window can be changed in a number of ways including any of those described above in connection with the root module 52.

Figure 26:
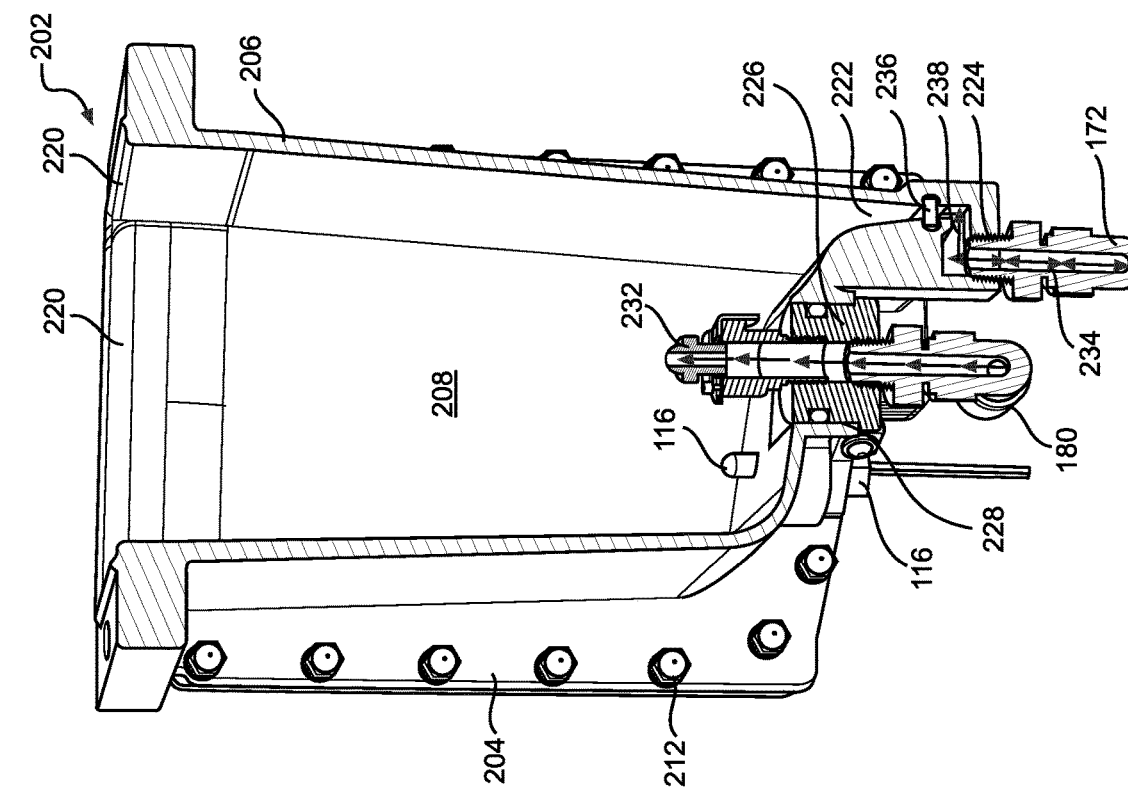
FIG. 26 is a front cross-sectional view of the main body in FIG. 21 showing fluid flow channels to and from the root chamber.
Figure 29:
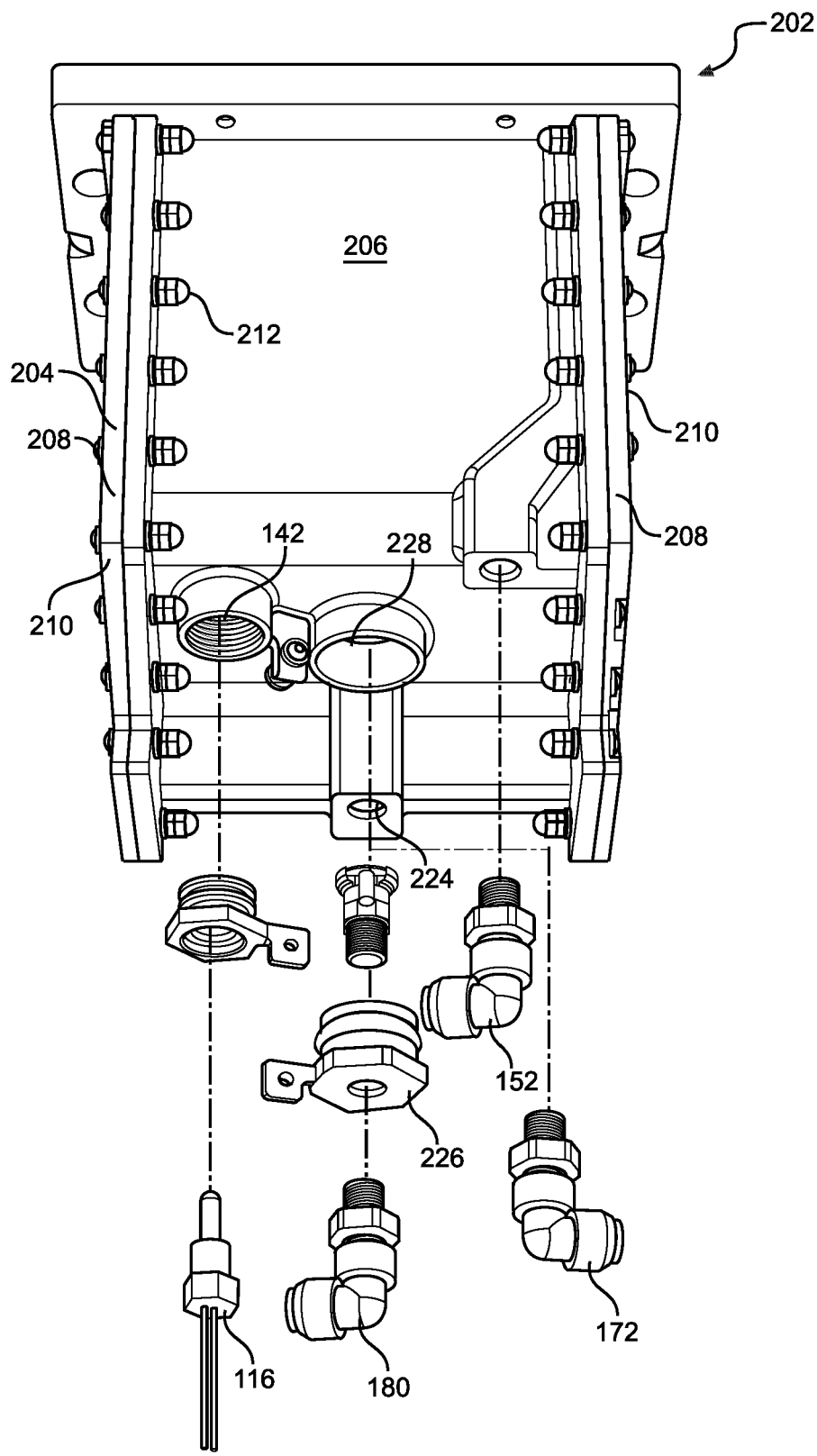
FIG. 29 is an exploded view of the main body in FIG. 21 showing the plumbing fixtures through which fluid travels to and from the root chamber.

The liquid flow channels for the hydroponic system and the aeroponics system of the root module 200 are similar to those of the root module 52. One difference is that the flow channels do not extend into the root chamber 202 through the same opening as they do in the root module 52. Instead, the plumbing fixtures 172 for the first flow channel for the hydroponic system extend into the root chamber 202 through an opening 224 in the bottom of the center section 206 of the main body 204 (FIGS. 26 and 29). Also, the plumbing fixtures 180 are coupled to an insert 226 configured to be received by a separate opening 228 in the bottom of the center section 206 of the main body 204.

Referring to FIG. 26, the liquid in the first flow channel flows upward along flow path 234 from the plumbing fixtures 172 to the capillary collection area 222. The liquid in the second flow channel flows upward along flow path 230 from the plumbing fixtures 180 through the insert 226 and out into the interior of the root chamber 202 through a spray nozzle 232.

A porous barrier or filter 236 is positioned in the bottom of the capillary collection area 222. In some embodiments, the porous barrier 236 extends along the entire length of the bottom of the capillary collection area 222. For example, the porous barrier 236 can extend from one side wall 208 to the other side wall 208. The capillary collection area 222 can include a space underneath the porous barrier 236 along which liquid can flow to reach the opening 238 at the junction of the first flow channel and the capillary collection area 222.

It should be appreciated that the porous barrier 236 can be made of any suitable material and can have any suitable shape capable of filtering root debris and other solids from the liquid in the root chamber 202. For example, the porous barrier 236 can be made of any of the materials described above in connection with the porous barrier 176. In some embodiments, the porous barrier 236 is made of a plastic or foam material.

FIGS. 30-41 show various embodiments of the root/shoot interface 76. The root/shoot interface 76 provides a physical barrier between the shoot zone and the root zone. It can prevent sprayed nutrient solution in the root zone from penetrating into the leafy region of the plants 64. The root/shoot interface 76 is also configured to receive and hold plant seed cartridges. The root/shoot interface 76 can be removable for replanting and subsequent reinstallation. The root/shoot interface 76 can be used to plant any suitable number of plants 64 including a single plant up to 15, 20, 25, or more, in any multiple thereof, depending on the plant species.

Figure 30:
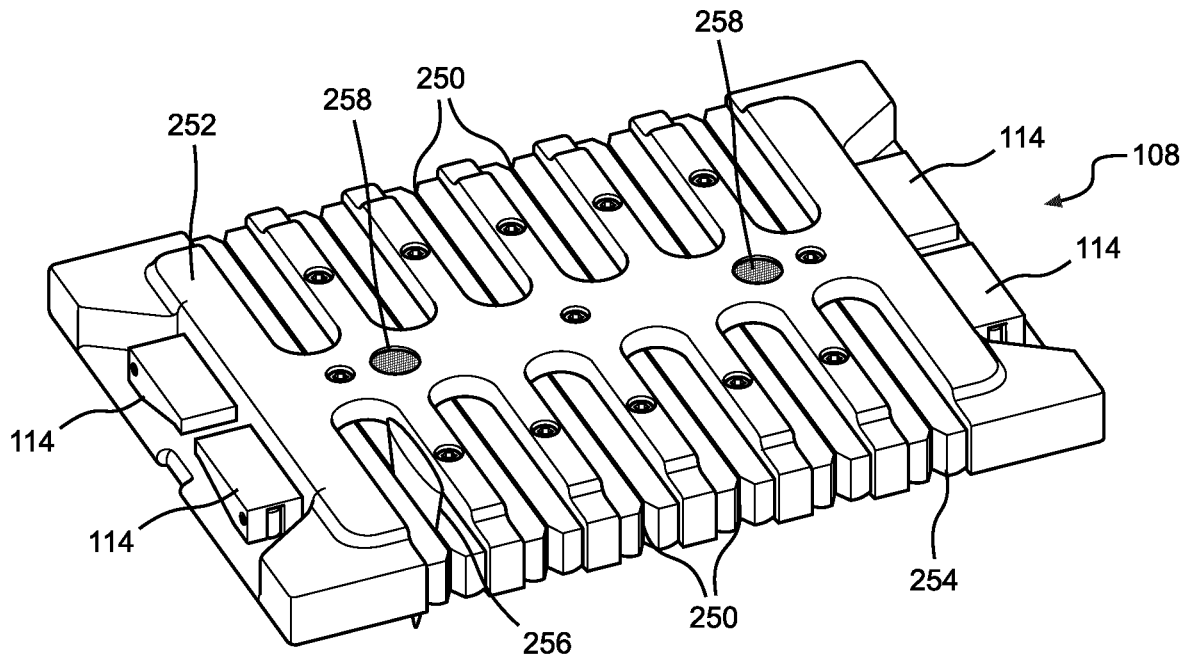
FIG. 30 is a top perspective view of one embodiment of a root/shoot interface.
Figure 31:
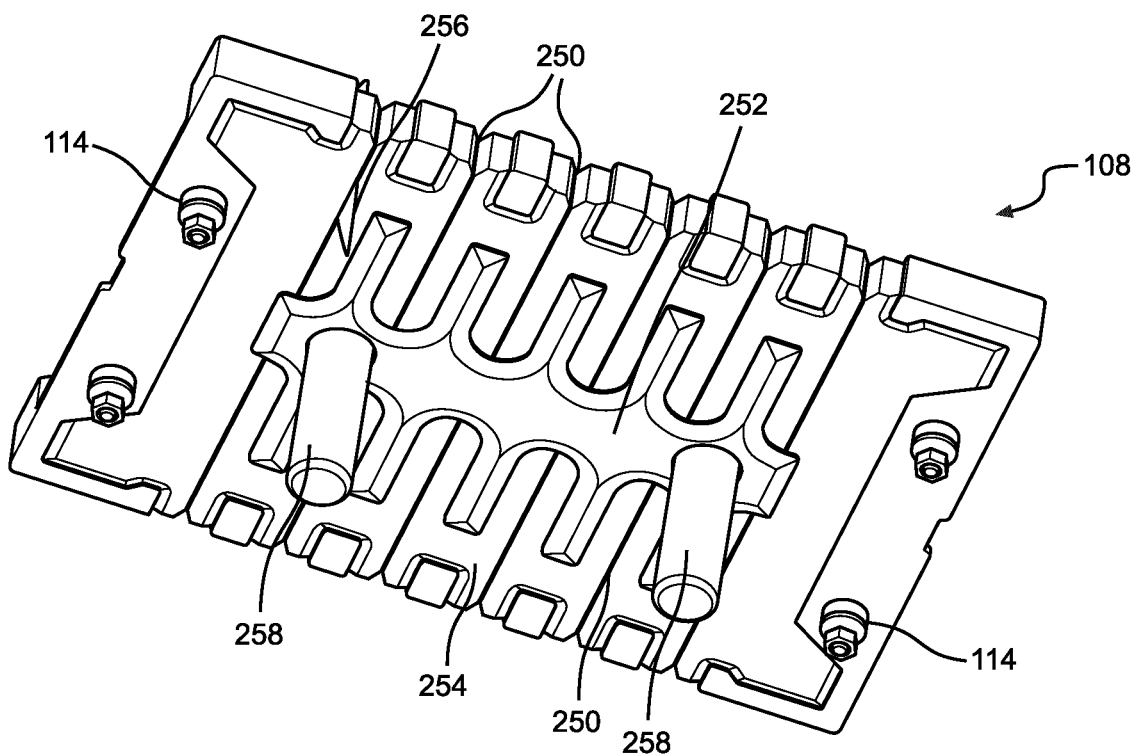
FIG. 31 is a bottom perspective view of the root/shoot interface in FIG. 30.

FIGS. 30-31 show top and bottom perspective views of the root/shoot interface 108 including a rigid support framework or shell 252, a resilient or conformal material 254, vents 258, and fasteners 114 used to couple the root/shoot interface 108 to the main body 110, 204. The support framework 252 provides a rigid support structure for the resilient material 254. The support framework 252 can be made of any suitable material including plastic, metal, composites, and the like. In some embodiments, the support framework 252 is made of a rigid plastic material.

The resilient material 254 is configured to create a fluid tight seal with and cover the main body 110, 204. It is also configured to receive and hold seeds to grow the plants 64. In some embodiments, the resilient material 254 includes multiple slits 250 (alternatively referred to as slots or slotted cavities) arranged parallel to each other and configured to receive one or more seed cartridges 256 containing seeds that will grow into the plants 64.

It should be appreciated that the resilient material 254 can have any suitable shape, size, and/or physical properties. It can also be made from any suitable material. In some embodiments, the resilient material 254 includes a foam material. For example, the resilient material 254 can include a closed cell silicone foam material. It should be appreciated that numerous modifications can be made to the resilient material 254 shown in FIGS. 30-31.

The vents 258 are configured to allow gas to enter and/or exit the root chamber 86, 202 to equalize the pressure between the root chamber 86, 202 and the surrounding environment, as well as bringing oxygen from the shoot systems 80 to the root systems 78. The vents 258 are also configured to prevent liquid from exiting the root chamber 86, 202 in a microgravity environment. In some embodiments, the vents 258 can be made of a porous material such as a porous plastic or foam material that allows gas to enter and exit the root chamber 86, 202 and prevents liquid from exiting the root chamber 86, 202.

Figure 33:
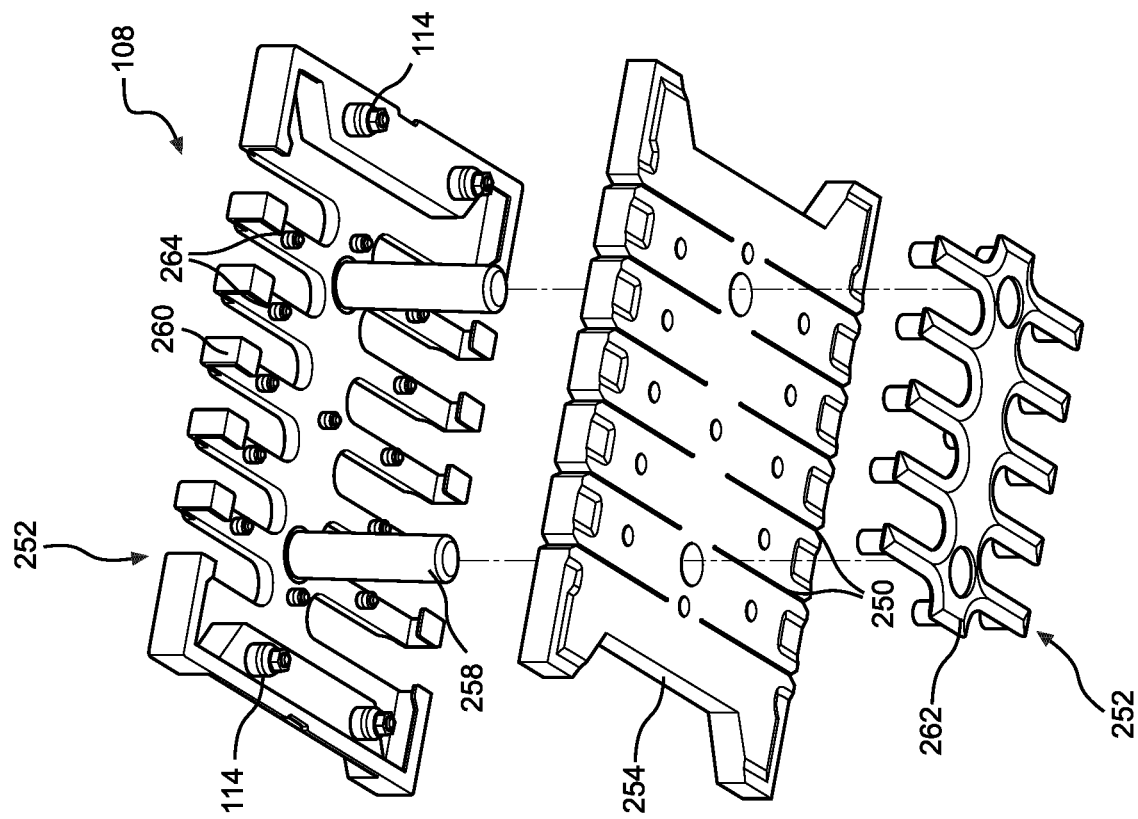
FIG. 33 is an exploded bottom perspective view of the root/shoot interface in FIGS. 30-31.
Figure 32:
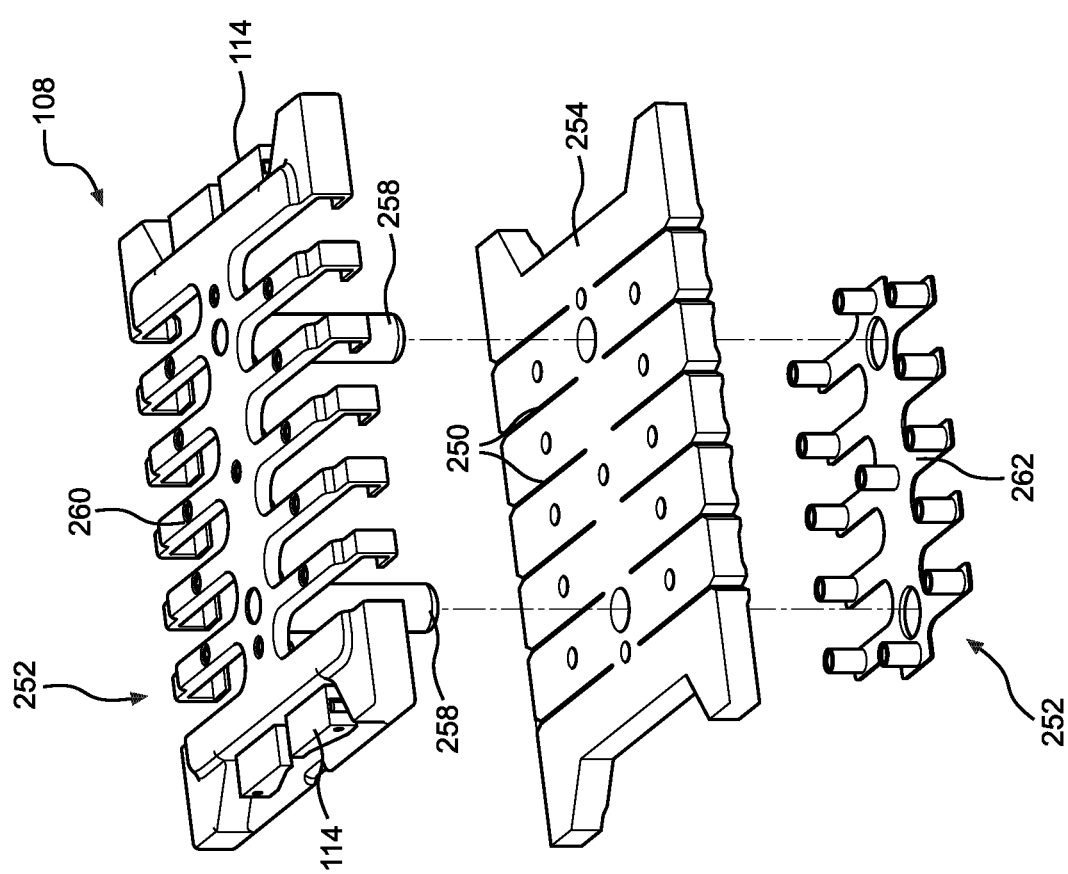
FIG. 32 is an exploded top perspective view of the root/shoot interface in FIGS. 30-31.

FIGS. 32-33 show top and bottom partially exploded views of the root/shoot interface 108. In some embodiments, the support framework 252 includes a first rigid support component 260 and a second rigid support component 262. The components 260, 262 are configured to be positioned on opposite sides of the resilient material 254 and coupled together with fasteners 264.

Figure 34:
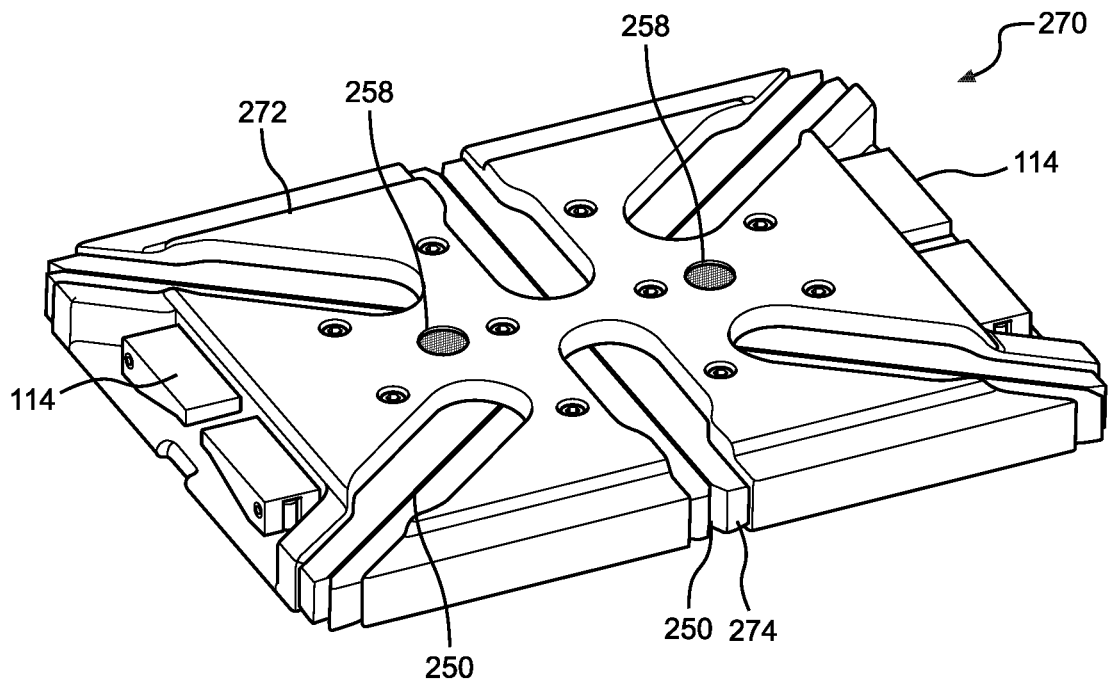
FIG. 34 is a top perspective view of another embodiment of the root/shoot interface.
Figure 35:
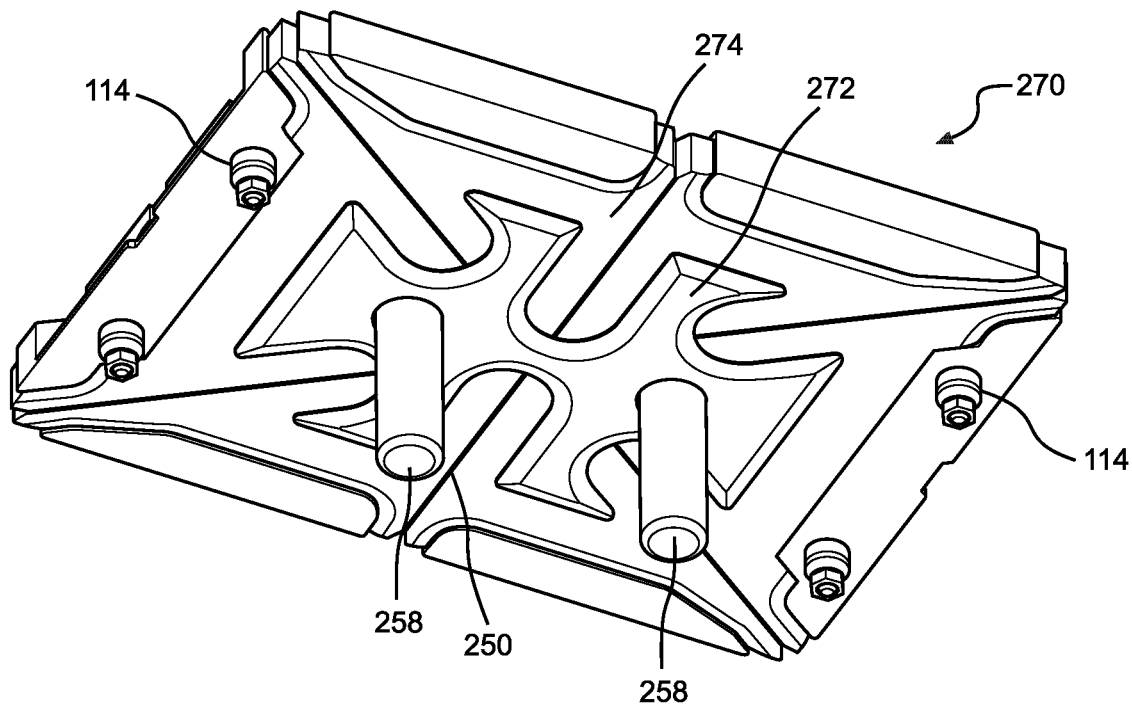
FIG. 35 is a bottom perspective view of the root/shoot interface in FIG. 34.

FIGS. 34-35 show top and bottom perspective views of another embodiment of a root/shoot interface 270 including four slits 250 extending inward at an angle from the corners of the root/shoot interface 270 and two slits 250 extending straight inward from opposite sides in the middle of root/shoot interface 270. The slits 250 extend inward at the corners to correspond to the capillary channels 136 in the root chamber 86.

The root/shoot interface 270 also includes a rigid support framework or shell 272, a resilient material 274, vents 258, and fasteners 114. The support framework 272 and the resilient material 274 can be configured the same or similar to the support framework 252 and the resilient material 254, respectively. Accordingly, the descriptions of the support framework 252 and the resilient material 254 apply equally to the support framework 272 and the resilient material 274.

Figure 37:
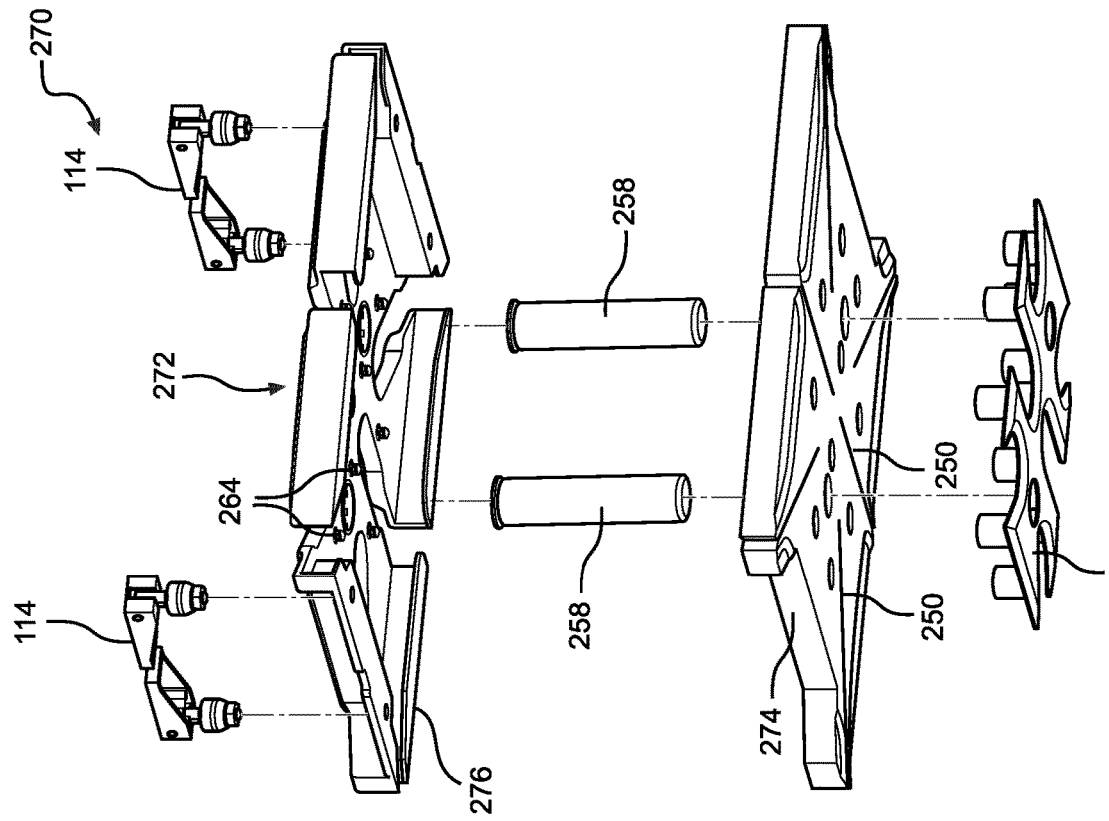
FIG. 37 is an exploded bottom perspective view of the root/shoot interface in FIGS. 34-35.
Figure 36:
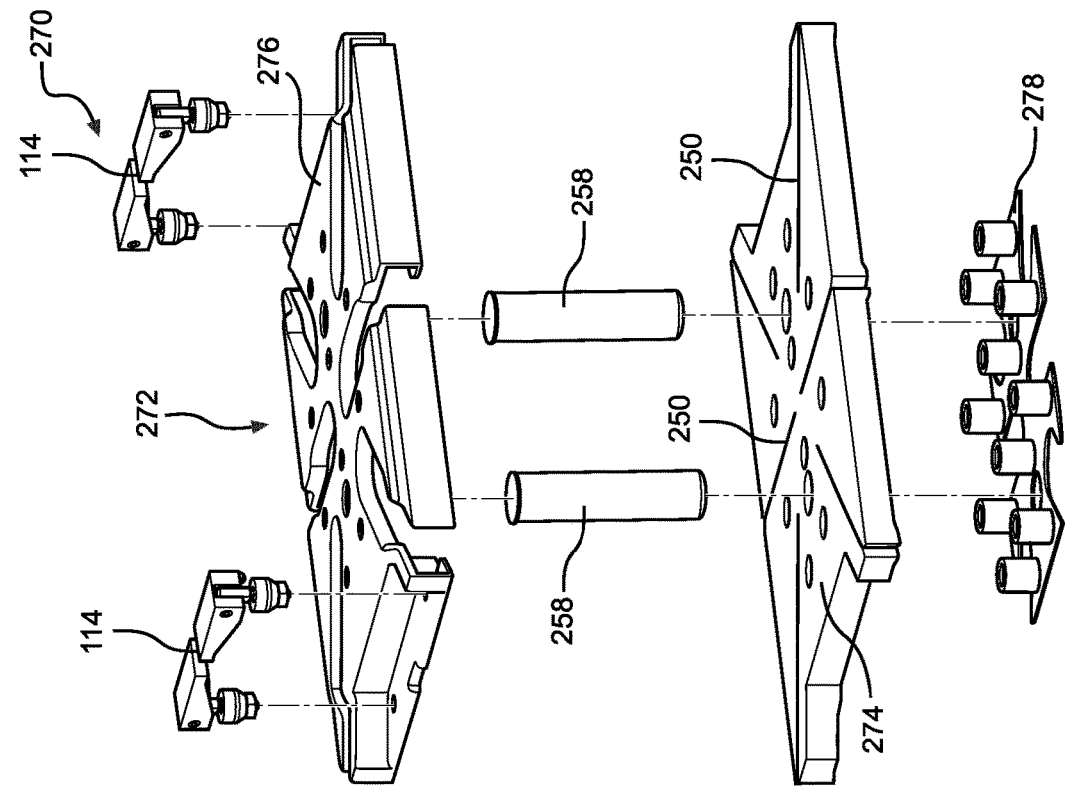
FIG. 36 is an exploded top perspective view of the root/shoot interface in FIGS. 34-35.

FIGS. 36-37 show top and bottom partially exploded views of the root/shoot interface 270. In some embodiments, the support framework 272 includes a first rigid support component 276 and a second rigid support component 278. The components 276, 278 are configured to be positioned on opposite sides of the resilient material 274 and coupled together with fasteners 264.

Figure 38:
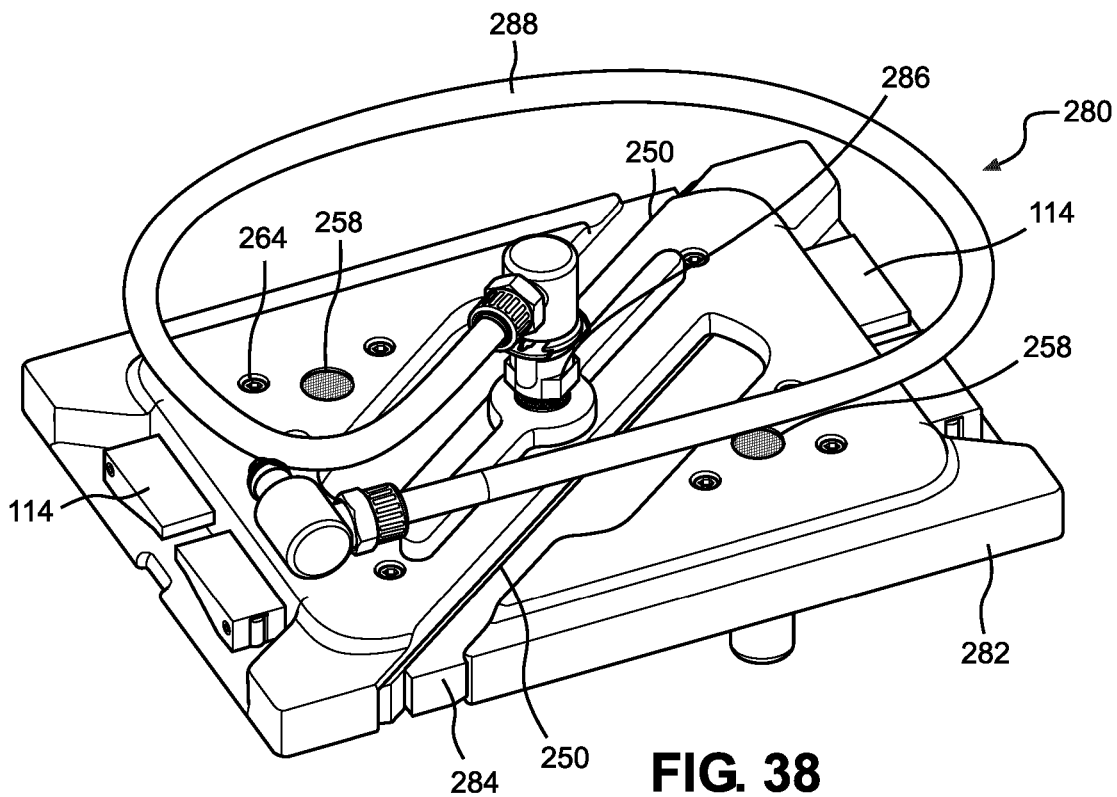
FIG. 38 is a top perspective view of another embodiment of the root/shoot interface.
Figure 39:
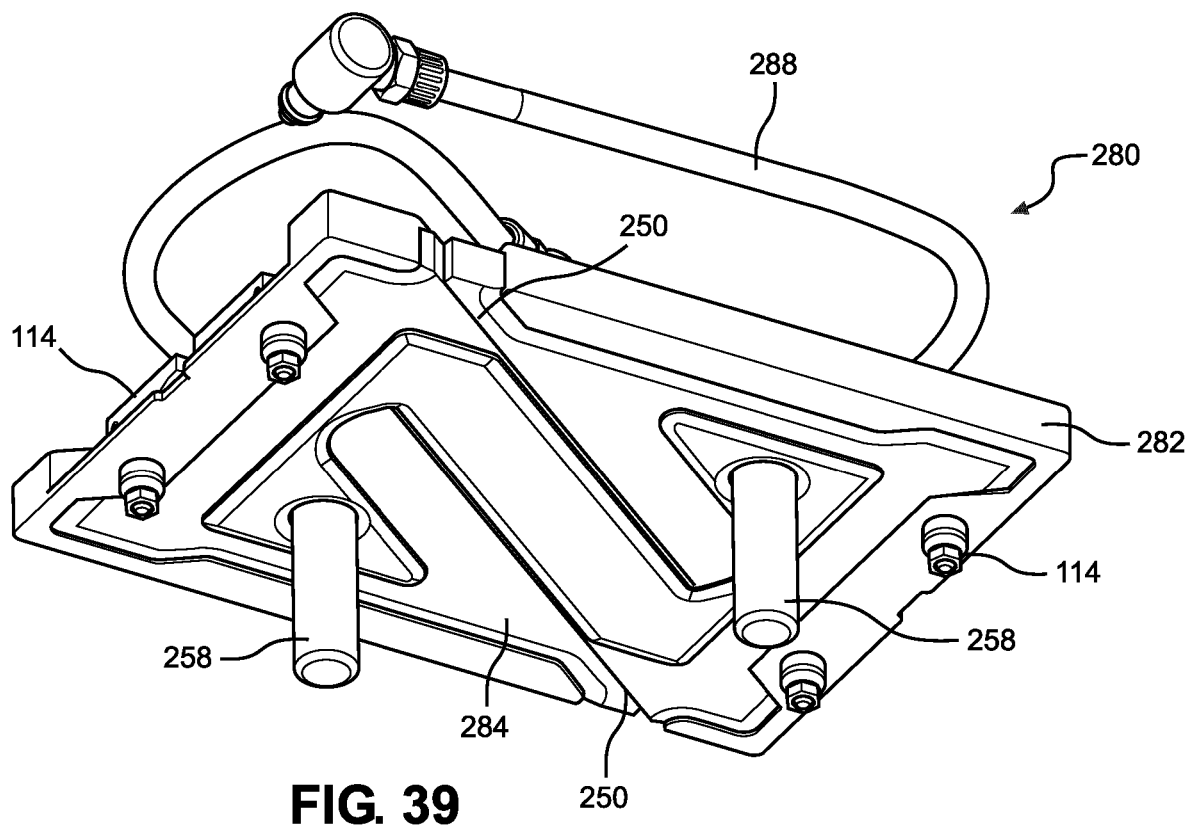
FIG. 39 is a bottom perspective view of the root/shoot interface in FIG. 38.

FIGS. 38-39 show top and bottom perspective views of another embodiment of the root/shoot interface 280 including a fluid port 286 coupled to a fluid line 288, a wicking material 290 in fluid communication with the fluid port 286, and two slits 250 extending diagonally inward and parallel to each other. The fluid port 286 and the fluid line 288 can be coupled to the liquid source 56 and can be used to supply fluid to or recover fluid from the root/shoot interface 280.

It should be appreciated that the wicking material 290 can be used to transport fluid to or away from the fluid port 286. In some embodiments, the wicking material 290 can be used to transport a nutrient solution to the slits 250. In some embodiments, the wicking material 290 can be used to transport fluid absorbed by the wicking material 290 in the root chamber 86, 202 to the fluid port 286.

The root/shoot interface 280 also includes a rigid support framework or shell 282, a resilient material 284, vents 258, and fasteners 114. The support framework 282 and the resilient material 284 can be configured the same or similar to the support framework 252 and the resilient material 254, respectively. Accordingly, the descriptions of the support framework 252 and the resilient material 254 apply equally to the support framework 282 and the resilient material 284.

Figure 41:
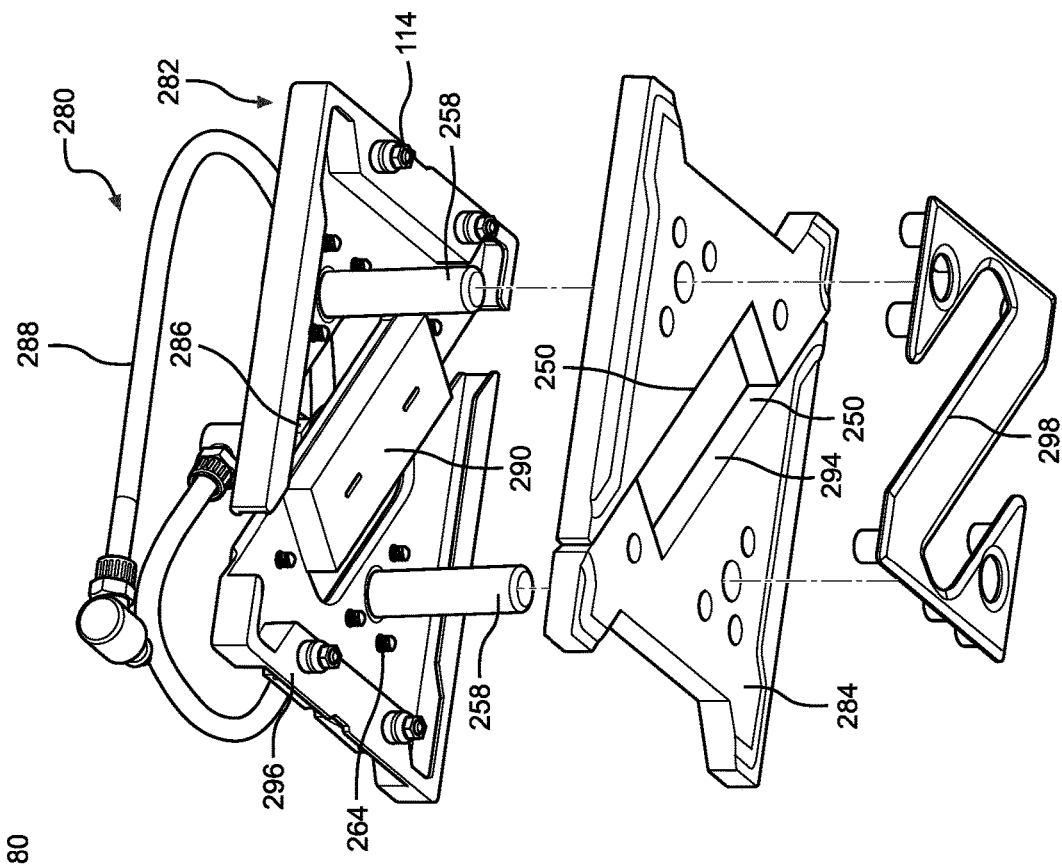
FIG. 41 is an exploded bottom perspective view of the root/shoot interface in FIGS. 38-39.
Figure 40:
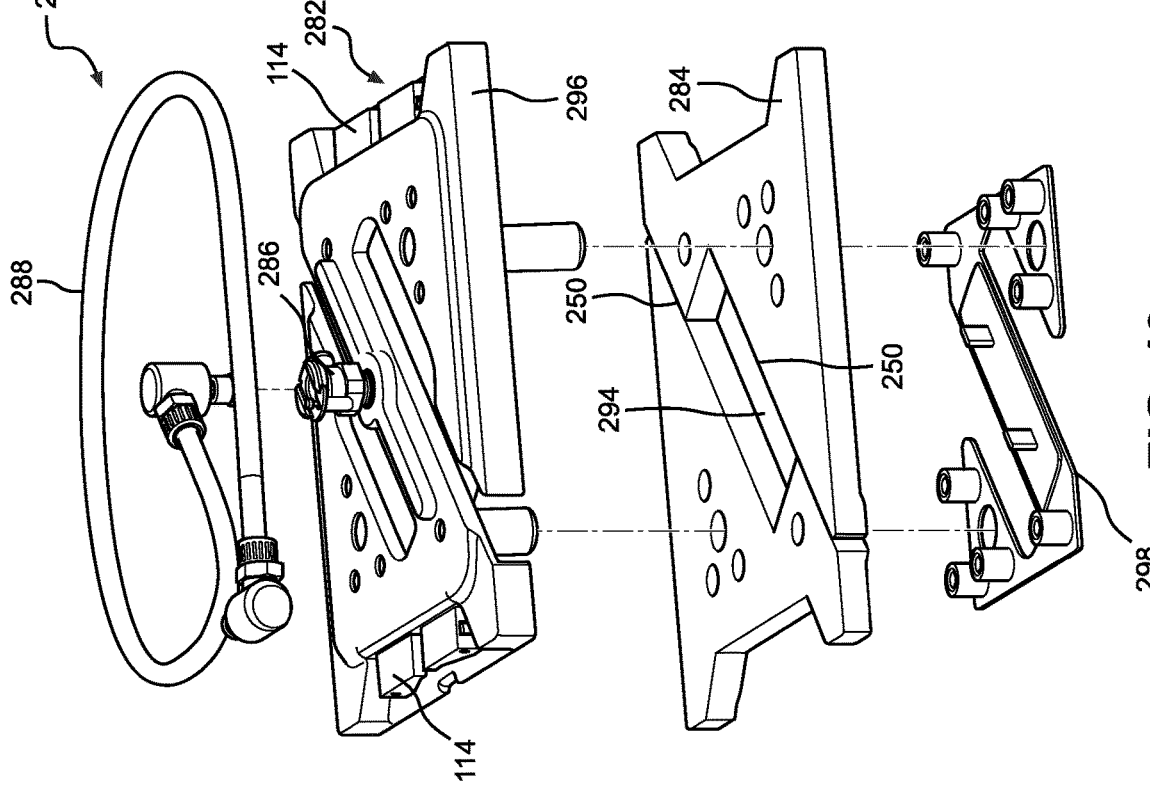
FIG. 40 is an exploded top perspective view of the root/shoot interface in FIGS. 38-39.

FIGS. 40-41 show top and bottom partially exploded views of the root/shoot interface 280. The resilient material 284 includes an opening 294 sized to receive the wicking material 290 with the slits 250 being formed at least in part by the resilient material 284 on one side and the wicking material 290 on the other side. Fluid received by the wicking material 290 at the fluid port 286 is transported to the slits 250 through the wicking material.

In some embodiments, the support framework 282 of the root/shoot interface 280 includes a first rigid support component 296 and a second rigid support component 298. The components 296, 298 are configured to be positioned on opposite sides of the resilient material 284 and coupled together with fasteners 264.

In some embodiments, a method for growing plants 64 with the plant growth system 50 includes planting seeds in the root/shoot interface 76 and spraying a nutrient solution on the bottom of the root/shoot interface 76 until the seeds germinate. Following germination, the nutrient solution is sprayed on the roots growing below the root/shoot interface 76. This method involves aeroponically supplying nutrients to the plant roots.

In some embodiments, a method for growing plants 64 with the plant growth system 50 includes planting seeds in the root/shoot interface 76 and supplying a nutrient solution to the seeds until they germinate. The nutrient solution can be supplied by spraying it on the bottom of the root/shoot interface 76 or by directly plumbing it to the root/shoot interface 76. Following germination, the interior of the root chamber can be periodically filled with and drained of the nutrient solution to provide nutrients to the plant roots. This method involves hydroponically and/or aeroponically supplying nutrients to the plant roots.

The methods above can be used in conjunction with the capillary channels positioned at or near the top, sides, and/or bottom of the root chamber to drain excess fluid from the root chamber. The capillary channels are configured to channel liquid in microgravity into tight grooves and toward the drain port at the bottom of the root chamber for removal.

In some embodiments, a method for observing growth of plant roots and/or evaluating the fluid delivery system and recovery techniques includes clearing a viewing window and taking an image of the interior of the root chamber. Clearing the viewing window can include directing a liquid flow over an interior surface of the viewing window to clear fluid spots and spray particles from it. Taking an image of the interior of the root chamber can include periodically taking an image of the interior to create a time lapse video or simply taking an ordinary video of the interior. The images can be taken while the liquid is flowing over the viewing window or shortly after the liquid has ceased flowing over the viewing window. The images can be taken with a camera.

Illustrative Embodiments

The following is a description of various embodiments of the disclosed subject matter. Each embodiment may include one or more of the various features, characteristics, or advantages of the disclosed subject matter. The embodiments are intended to illustrate a few aspects of the disclosed subject matter and should not be considered a comprehensive or exhaustive description of all possible embodiments.

P1. A root chamber comprising: a main body including one or more sides and a bottom; a root/shoot interface coupled to the main body, the root/shoot interface being configured to hold a plant having a root system extending outward from one side of the root/shoot interface into the root chamber and a shoot system extending outward from another side of the root/shoot interface outside of the root chamber; and capillary channels extending along the one or more sides of the main body and converging at a capillary collection area in the bottom of the main body; wherein the root chamber is configured to prevent liquid from escaping from the root chamber in a microgravity environment.

P2. The root chamber of paragraph P1 wherein at least one of the capillary channels is positioned in a corner of the root chamber.

P3. The root chamber of paragraphs P1-P2 wherein the root chamber includes at least four corners and at least one of the capillary channels is positioned in each of the four corners.

P4. The root chamber of paragraphs P1-P3 comprising a capillary channel positioned at a junction between the main body and the root/shoot interface.

P5. The root chamber of paragraphs P1-P4 wherein the capillary channels have a wedge shape that is open approximately 5° to approximately 25°.

P6. The root chamber of paragraphs P1-P5 comprising a porous barrier positioned in the capillary collection area.

P7. The root chamber of paragraphs P1-P6 comprising a drain in fluid communication with the capillary collection area.

P8. The root chamber of paragraphs P1-P7 wherein at least a portion of the main body is 3D printed.

P9. A method comprising growing a plant in the microgravity environment with the root chamber of paragraphs P1-P8.

P10. A root chamber comprising: a main body; and a root/shoot interface coupled to the main body, the root/shoot interface comprising: a first rigid structure; a second rigid structure coupled to the first rigid structure; and a gasket positioned between the first rigid structure and the second rigid structure wherein the root/shoot interface is configured to hold a plant having a root system extending outward from one side of the root/shoot interface into the root chamber and a shoot system extending outward from another side of the root/shoot interface outside of the root chamber; and wherein the root chamber is configured to prevent liquid from escaping from the root chamber in a microgravity environment.

P11. The root chamber of paragraph P10 wherein the gasket is configured to receive and hold a plant seed.

P12. The root chamber of paragraphs P10-P11 comprising a vent extending through the root/shoot interface, the vent being configured to allow gas exchange between the root chamber and the surrounding environment and prevent liquid from escaping from the root chamber.

P13. A method comprising growing a plant in the microgravity environment with the root chamber of paragraphs P10-P12.

P14. A root chamber comprising: a main body; and a root/shoot interface coupled to the main body, the root/shoot interface being configured to receive and hold a plant seed; wherein the root/shoot interface includes a port configured to connect to a fluid line; and wherein the root chamber is configured to prevent liquid from escaping from the root chamber in a microgravity environment.

P15. The root chamber of paragraph P14 comprising a wicking material in fluid communication with the port, the wicking material being configured to transport liquid between the port and the plant seed.

P16. A plant growth system comprising: the root chamber of paragraphs P14-P15; the fluid line coupled to the port; and a controller configured to control liquid flow through the fluid line; wherein the controller is configured to supply liquid to the root/shoot interface and/or withdraw liquid from the root/shoot interface.

P17. A method comprising growing a plant in the microgravity environment with the root chamber of paragraphs P14-P16.

P18. A root chamber comprising: a main body; a root/shoot interface coupled to the main body, the root/shoot interface being configured to hold a plant having a root system extending outward from one side of the root/shoot interface into the root chamber and a shoot system extending outward from another side of the root/shoot interface outside of the root chamber; and a vent configured to allow gas exchange between the root chamber and the surrounding environment and prevent liquid from escaping from the root chamber; wherein the root chamber is configured to prevent liquid from escaping from the root chamber in a microgravity environment.

P19. The root chamber of paragraph P18 wherein the vent is part of the root/shoot interface.

P20. A method comprising growing a plant in the microgravity environment with the root chamber of paragraphs P18-P19.

P21 A root chamber comprising: a main body including at least one transparent wall area through which an interior of the root chamber is visible; and a root/shoot interface coupled to the main body, the root/shoot interface being configured to hold a plant having a root system extending outward from one side of the root/shoot interface into the root chamber and a shoot system extending outward from another side of the root/shoot interface outside of the root chamber; wherein the root chamber is configured to prevent liquid from escaping from the root chamber in a microgravity environment.

P22. The root chamber of paragraph P21 comprising a fluid outlet configured to direct a flow of liquid over an interior surface of the transparent wall area of the main body.

P23. The root chamber of paragraphs P21-P22 comprising a light source configured to illuminate the interior of the root chamber.

P24. A plant growth system comprising: the root chamber of paragraphs P21-P23; an imaging device; wherein the imaging device is configured to take images of the interior of the root chamber through the transparent wall area of the main body.

P25. A method comprising growing a plant in the microgravity environment with the root chamber of paragraphs P21-P24.

P26. A method for viewing an interior of a root chamber, the root chamber comprising: a transparent wall area through which an interior of the root chamber is visible; wherein the root chamber is configured to prevent liquid from escaping from the root chamber in a microgravity environment; the method comprising: directing a flow of liquid over an interior surface of the transparent wall area.

P27. The method of paragraph P26 wherein the flow of liquid is a laminar over the interior surface of the transparent wall area.

P28. The method of paragraphs P26-P27 comprising taking an image of the interior of the root chamber.

P29. The method of paragraph P28 wherein the image is taken while the liquid is flowing over the interior surface of the transparent wall area.

P30. A plant growth system comprising: a root chamber configured to prevent liquid from escaping from the root chamber in a microgravity environment; a hydroponic system configured to fill and drain the root chamber with a nutrient solution; and an aeroponic system configured to spray the nutrient solution into the root chamber.

P31. The plant growth system of paragraph P30 comprising an opening in the bottom of the root chamber and an insert positioned in the opening, wherein the insert includes a first flow channel through which the hydroponic system fills and drains the root chamber with the nutrient solution and a second flow channel through which the aeroponic system sprays the nutrient solution into the root chamber.

P32. A plant growth system comprising: a root chamber including an opening in the bottom, the root chamber being configured to prevent liquid from escaping from the root chamber in a microgravity environment; and an insert positioned in the opening in the bottom of the root chamber; wherein the insert includes a first flow channel through which the hydroponic system fills and drains the root chamber with the nutrient solution and a second flow channel through which the aeroponic system sprays the nutrient solution into the root chamber.

P33. The plant growth system of paragraph P32 comprising a liquid source containing the nutrient solution, the liquid source being in fluid communication with the first flow channel and the second flow channel.

P34. A plant growth system comprising: a controller; and a root chamber including a drain for liquid, the root chamber being configured to prevent liquid from escaping from the root chamber in a microgravity environment; wherein the controller is configured to determine the flow rate of liquid and/or gas through the drain and shut off the drain based on the flow rate of the liquid being below a threshold value or the flow rate of the gas being above a threshold value.

P35. The plant growth system of paragraph P34 comprising an ultrasonic bubble detector configured to provide information to the controller about the flow rate of the liquid and/or the gas through the drain.

P36. A root chamber comprising: a main body; and a root/shoot interface coupled to the main body, the root/shoot interface being configured to hold a plant having a root system extending outward from one side of the root/shoot interface into the root chamber and a shoot system extending outward from another side of the root/shoot interface outside of the root chamber; wherein the root chamber is configured to prevent liquid from escaping from the root chamber in a microgravity environment.

P37. A method comprising growing a plant in the microgravity environment with the root chamber of paragraph P36.

P38. The plant growth system of claim P36 wherein the root chamber is configured to recover liquid in the microgravity environment.

P39. A plant growth system comprising: a main body; and a root/shoot interface coupled to the main body, the root/shoot interface and the main body forming at least part of a root chamber, the root/shoot interface being configured to hold a plant having a root system extending outward from one side of the root/shoot interface into the root chamber and a shoot system extending outward from another side of the root/shoot interface outside of the root chamber; a hydroponic system configured to fill and drain the root chamber with a nutrient solution; and an aeroponic system configured to spray the nutrient solution into the root chamber; wherein the root chamber configured to prevent liquid from escaping from the root chamber in a microgravity environment.

P40. The plant growth system of paragraph P39 wherein the root chamber includes a liquid collection system configured to recover liquid in the microgravity environment.

P41. The plant growth system of any one of paragraphs P39-P40 wherein the main body includes at least one transparent wall area through which an interior of the root chamber is visible.

P42. The plant growth system of paragraph P41 comprising a liquid outlet positioned to supply a flow of liquid over an interior surface of the transparent wall area of the main body.

P43. The plant growth system of any one of paragraphs P41-P42 comprising an imaging device configured to take images of the interior of the root chamber through the transparent wall area of the main body.

P44. A method comprising directing a flow of liquid over an interior surface of the transparent wall area of the main body of the plant growth system of paragraph P41-P43.

P45. The method of paragraph P44 comprising taking an image of the interior of the root chamber while the liquid is flowing over the interior surface of the transparent wall area.

P46. The plant growth system of any one of paragraphs P39-P43 comprising a controller configured to determine the flow rate of liquid and/or gas through a drain and shut off the drain based on the flow rate of the liquid being below a threshold value or the flow rate of the gas being above a threshold value P47. The plant growth system of any one of paragraphs P39-P43 or P46 comprising a controller and an ultrasonic bubble detector configured to provide information to the controller about the flow rate of the liquid and/or the gas through a drain.

P48. A root chamber comprising: a main body; and at least one capillary channel extending along an interior surface of the root chamber to a capillary collection area in the root chamber; wherein the root chamber is configured to prevent liquid from escaping from the root chamber in a microgravity environment; and wherein the root chamber is configured to collect and recover the liquid in the root chamber in a microgravity environment.

P49. The root chamber of paragraph P48 wherein the at least one capillary channel is positioned in a corner of the root chamber.

P50. The root chamber of paragraph P48 wherein the root chamber includes at least four corners and at least one of the capillary channels is positioned in each of the four corners.

P51. The root chamber of paragraph P48 wherein the at least one capillary channel is positioned at a junction between the main body and a root/shoot interface.

P52. The root chamber of paragraph P48 wherein the at least one capillary channel has a wedge shape that is open approximately 5° to approximately 25°.

P53. The root chamber of paragraph P48 comprising a porous barrier positioned in the capillary collection area.

P54. The root chamber of paragraph P48 comprising a drain in fluid communication with the capillary collection area.

P55. A root/shoot interface comprising: a first rigid structure; a second rigid structure coupled to the first rigid structure; and a gasket positioned between the first rigid structure and the second rigid structure wherein the root/shoot interface is configured to be coupled to a main body to form a root chamber from which liquid cannot escape in a microgravity environment; and wherein the root/shoot interface is configured to hold a plant having a root system extending outward from one side of the root/shoot interface into the root chamber and a shoot system extending outward from another side of the root/shoot interface outside of the root chamber.

P56. The root/shoot interface of paragraph P55 comprising a vent configured to allow gas exchange between the root chamber and the surrounding environment.

P57. The root/shoot interface of any one of paragraphs P55-P56 comprising a fluid port configured to supply fluid to the plant.

P58. The root/shoot interface of any one of paragraphs P55-P57 comprising a wicking material in fluid communication with the port, the wicking material being configured to transport liquid between the port and the plant.

General Terminology and Interpretative Conventions

Any methods described in the claims or specification should not be interpreted to require the steps to be performed in a specific order unless expressly stated otherwise. Also, the methods should be interpreted to provide support to perform the recited steps in any order unless expressly stated otherwise.

Certain features described in the context of separate embodiments can also be implemented in combination in a single embodiment. Conversely, various features that are described in the context of a single embodiment can also be implemented in multiple embodiments separately or in any suitable subcombination. Moreover, although features may be described above in certain combinations and even initially claimed as such, one or more features from a claimed combination can be excised from the combination, and the claimed combination may be directed to a subcombination or variation of a subcombination.

The example configurations described in this document do not represent all the examples that may be implemented or that are within the scope of the claims. The term "example" shall be interpreted to mean "serving as an example, instance, or illustration," and not "preferred" or "advantageous over other examples."

Articles such as "the," "a," and "an" can connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all the items together, or any combination or number of the items.

The phrase "based on" shall be interpreted to refer to an open set of conditions unless unequivocally stated otherwise (e.g., based on only a given condition). For example, a step described as being based on a given condition may be based on the recited condition and one or more unrecited conditions.

The terms have, having, contain, containing, include, including, and characterized by should be interpreted to be synonymous with the terms comprise and comprising—i.e., the terms are inclusive or open-ended and do not exclude additional unrecited subject matter. The use of these terms should also be understood as disclosing and providing support for narrower alternative embodiments where these terms are replaced by "consisting" or "consisting essentially of."

Unless otherwise indicated, all numbers or expressions, such as those expressing dimensions, physical characteristics, and the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should be construed in light of the number of recited significant digits and by applying ordinary rounding techniques.

All disclosed ranges are to be understood to encompass and provide support for claims that recite any subranges or any individual values subsumed by each range. For example, a stated range of 1 to 10 should be considered to include and provide support for claims that recite any subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth), which values can be expressed alone or as a minimum value (e.g., at least 5.8) or a maximum value (e.g., no more than 9.9994).

All disclosed numerical values are to be understood as being variable from 0-100% in either direction and thus provide support for claims that recite such values (either alone or as a minimum or a maximum—e.g., at least <value> or no more than <value>) or any ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range expressed individually (e.g., 15.2), as a minimum value (e.g., at least 4.3), or as a maximum value (e.g., no more than 12.4).

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

The subject matter recited in the claims is not coextensive with and should not be interpreted to be coextensive with any embodiment, feature, or combination of features described or illustrated in this document. This is true even if only a single embodiment of the feature or combination of features is illustrated and described.

Joining or Fastening Terminology and Interpretative Conventions

The term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

The term "coupled" includes joining that is permanent in nature or releasable and/or removable in nature. Permanent joining refers to joining the components together in a manner that is not capable of being reversed or returned to the original condition. Releasable joining refers to joining the components together in a manner that is capable of being reversed or returned to the original condition.

Releasable joining can be further categorized based on the difficulty of releasing the components and/or whether the components are released as part of their ordinary operation and/or use. Readily or easily releasable joining refers to joining that can be readily, easily, and/or promptly released with little or no difficulty or effort. Difficult or hard to release joining refers to joining that is difficult, hard, or arduous to release and/or requires substantial effort to release. The joining can be released or intended to be released as part of the ordinary operation and/or use of the components or only in extraordinary situations and/or circumstances. In the latter case, the joining can be intended to remain joined for a long, indefinite period until the extraordinary circumstances arise.

It should be appreciated that the components can be joined together using any type of fastening method and/or fastener. The fastening method refers to the way the components are joined. A fastener is generally a separate component used in a mechanical fastening method to mechanically join the components together. A list of examples of fastening methods and/or fasteners are given below. The list is divided according to whether the fastening method and/or fastener is generally permanent, readily released, or difficult to release.

Examples of permanent fastening methods include welding, soldering, brazing, crimping, riveting, stapling, stitching, some types of nailing, some types of adhering, and some types of cementing. Examples of permanent fasteners include some types of nails, some types of dowel pins, most types of rivets, most types of staples, stitches, most types of structural ties, and toggle bolts.

Examples of readily releasable fastening methods include clamping, pinning, clipping, latching, clasping, buttoning, zipping, buckling, and tying. Examples of readily releasable fasteners include snap fasteners, retainer rings, circlips, split pin, linchpins, R-pins, clevis fasteners, cotter pins, latches, hook and loop fasteners (VELCRO), hook and eye fasteners, push pins, clips, clasps, clamps, zip ties, zippers, buttons, buckles, split pin fasteners, and/or conformat fasteners.

Examples of difficult to release fastening methods include bolting, screwing, most types of threaded fastening, and some types of nailing. Examples of difficult to release fasteners include bolts, screws, most types of threaded fasteners, some types of nails, some types of dowel pins, a few types of rivets, a few types of structural ties.

It should be appreciated that the fastening methods and fasteners are categorized above based on their most common configurations and/or applications. The fastening methods and fasteners can fall into other categories or multiple categories depending on their specific configurations and/or applications. For example, rope, string, wire, cable, chain, and the like can be permanent, readily releasable, or difficult to release depending on the application.

Drawing Related Terminology and Interpretative Conventions

Reference numbers in the drawings and corresponding description refer to identical or similar elements although such numbers may be referenced in the context of different embodiments.

The drawings are intended to illustrate embodiments that are both drawn to scale and/or not drawn to scale. This means the drawings can be interpreted, for example, as showing: (a) everything drawn to scale, (b) nothing drawn to scale, or (c) one or more features drawn to scale and one or more features not drawn to scale. Accordingly, the drawings can serve to provide support to recite the sizes, proportions, and/or other dimensions of any of the illustrated features either alone or relative to each other. Furthermore, all such sizes, proportions, and/or other dimensions are to be understood as being variable from 0-100% in either direction and thus provide support for claims that recite such values or any ranges or subranges that can be formed by such values.

Spatial or directional terms, such as "left," "right," "front," "back," and the like, relate to the subject matter as it is shown in the drawings and/or how it is commonly oriented during manufacture, use, or the like. However, it is to be understood that the described subject matter may assume various alternative orientations and, accordingly, such terms are not to be considered as limiting.

The invention claimed is:

1. A plant growth system comprising:
a main body; and
a root/shoot interface coupled to the main body, the root/shoot interface and the main body forming at least part of a root chamber, the root/shoot interface being configured to hold a plant having a root system extending outward from one side of the root/shoot interface into the root chamber and a shoot system extending outward from another side of the root/shoot interface outside of the root chamber;
a hydroponic system configured to fill and drain the root chamber with a nutrient solution; and
an aeroponic system configured to spray the nutrient solution into the root chamber;
wherein the root chamber is entirely enclosed and configured to prevent liquid from escaping from the root chamber in a microgravity environment and wherein a gasket is coupled to the root chamber to form a fluid tight environment of the root chamber that keeps liquid contained within the root chamber in a microgravity environment;
capillary channels formed entirely of capillary tubes positioned horizontally at an interface between the main body and the root/shoot interface, positioned vertically along interior corners of the main body, and positioned horizontally along a bottom of the main body, wherein the capillary channels converge to a capillary collection area positioned in a center of the main body;
a drain in fluid communication with the capillary collection area; and
wherein the capillary channels are grooves positioned in the interior corners and along the bottom of the main body and formed when the root/shoot interface and the main body are coupled together.

2. The plant growth system of claim 1 wherein the root chamber includes a liquid collection system configured to recover liquid in the microgravity environment.

3. The plant growth system of claim 1 wherein the main body includes at least one transparent wall area through which an interior of the root chamber is visible.

4. The plant growth system of claim 3 comprising a liquid outlet positioned to supply a flow of liquid over an interior surface of the transparent wall area of the main body to clear the transparent wall area and provide a clear view through the transparent wall area.

5. The plant growth system of claim 3 comprising an imaging device configured to take images of the interior of the root chamber through the transparent wall area of the main body.

6. The plant growth system of claim 1 comprising a controller configured to determine the flow rate of liquid and/or gas through a drain and shut off the drain based on the flow rate of the liquid being below a threshold value or the flow rate of the gas being above a threshold value.

7. The plant growth system of claim 1 comprising a controller and an ultrasonic bubble detector configured to provide information to the controller about the flow rate of the liquid and/or the gas through a drain.

8. The plant growth system of claim 1 wherein the root/shoot interface is removably attached to the main body.

9. The plant growth system of claim 8 wherein the root-shoot interface includes at least one opening configured to receive one or more seed cartridge containing seeds.

10. The plant growth system of claim 8 wherein the root-shoot interface includes multiple openings arranged in a spaced relationship to each other and configured to receive one or more seed cartridges containing seeds.

11. The plant growth system of claim 1, further comprising at least one sensor configured to monitor a temperature in the root chamber, fluid levels in the root chamber, and fluid flows to and from the root chamber.

12. The plant growth system of claim 11, further comprising a light source configured to illuminate an interior of the root chamber.

13. The plant growth system of claim 1, further comprising at least one window on a side wall of the main body through which the root chamber is visible.

14. The plant growth system of claim 1, wherein the capillary channels are sized and shaped to use capillary forces and/or surface tension to cause liquid to flow to the capillary collection area without the assistance of external forces.

15. The plant growth system of claim 1, wherein the capillary channels have an open wedge shape open 5 degrees to 25 degrees.

16. The plant growth system of claim 1, wherein the capillary channels positioned horizontally are positioned entirely within a common horizontal plane.

* * * * *